US011210261B2

(12) United States Patent
Khan et al.

(10) Patent No.: US 11,210,261 B2
(45) Date of Patent: Dec. 28, 2021

(54) SYSTEMS AND METHODS FOR SYNCHRONIZING FRAME PROCESSING WITHIN A MULTI-STAGE MODULAR ARCHITECTURE

(71) Applicant: Verizon Patent and Licensing Inc., Arlington, VA (US)

(72) Inventors: Nazneen Khan, Alpharetta, GA (US); Denny Breitenfeld, Florham Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 78 days.

(21) Appl. No.: 16/725,315

(22) Filed: Dec. 23, 2019

(65) Prior Publication Data
US 2021/0191898 A1 Jun. 24, 2021

(51) Int. Cl.
*G06F 15/78* (2006.01)
*G06T 15/08* (2011.01)

(52) U.S. Cl.
CPC .......... *G06F 15/7896* (2013.01); *G06T 15/08* (2013.01)

(58) Field of Classification Search
CPC ........ G06F 15/7896; G06F 9/44; G06T 15/08
See application file for complete search history.

(56) References Cited

U.S. PATENT DOCUMENTS 6,532,017 B1 * 3/2003 Knittel ................. G06T 15/005
 345/424
6,888,819 B1 * 5/2005 Mushkin ............... H04J 3/0652
 370/350

FOREIGN PATENT DOCUMENTS

EP 0071727 A1 * 2/1983 ......... G06F 15/7896

* cited by examiner

*Primary Examiner* — William A Beutel

(57) ABSTRACT

An exemplary plurality of system nodes is arranged in a multi-stage modular architecture. A first system node performs a first frame processing task on a first frame of a frame sequence, and a second system node performs a second frame processing task on a second frame of the frame sequence. The first and second system nodes are included respectively, within first and second pipeline stages of the multi-stage modular architecture, and the first and second frame processing tasks are associated with the respective first and second pipeline stages. Subsequent to performing the first and second frame processing tasks, the first and second system nodes transmit the first and second frames to additional system nodes included within subsequent pipeline stages of the multi-stage modular architecture. These transmissions are synchronized so as to be performed within a predetermined threshold time of one another. Corresponding systems and methods are also disclosed.

20 Claims, 12 Drawing Sheets

SYSTEMS AND METHODS FOR SYNCHRONIZING FRAME PROCESSING WITHIN A MULTI-STAGE MODULAR ARCHITECTURE

BACKGROUND INFORMATION

Various large-scale computing tasks may require too much computing power to be reasonably performed by a single computing node (e.g., a single server, a single device, etc.) or within a single stage (i.e., all at once, as opposed to being performed incrementally in a series of stages or process steps).

As one example of a technology that may involve such large-scale computing tasks, extended reality (e.g., virtual reality, augmented reality, mixed reality, etc.) content may be generated to provide partially or fully simulated realities to be experienced by users for a variety of entertainment, educational, vocational, and/or other enjoyable and enriching types of applications. In certain examples, extended reality content may be based on real world places and objects that are captured using capture devices such as video cameras and microphones. In some of these examples, real world places and objects may be captured and represented in real time so as to allow the places and objects to be experienced live as events occur in the real world.

In order to perform large-scale computing tasks such as real-time extended reality content generation and/or various other types of large-scale computations, large and complex computing architectures including multiple system nodes and/or pipeline stages may be employed. There remains room for improvement, however, in designing and deploying these architectures in ways that allow the large-scale processing performed by the architectures to be as efficient, effective, scalable, and reliable as possible.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
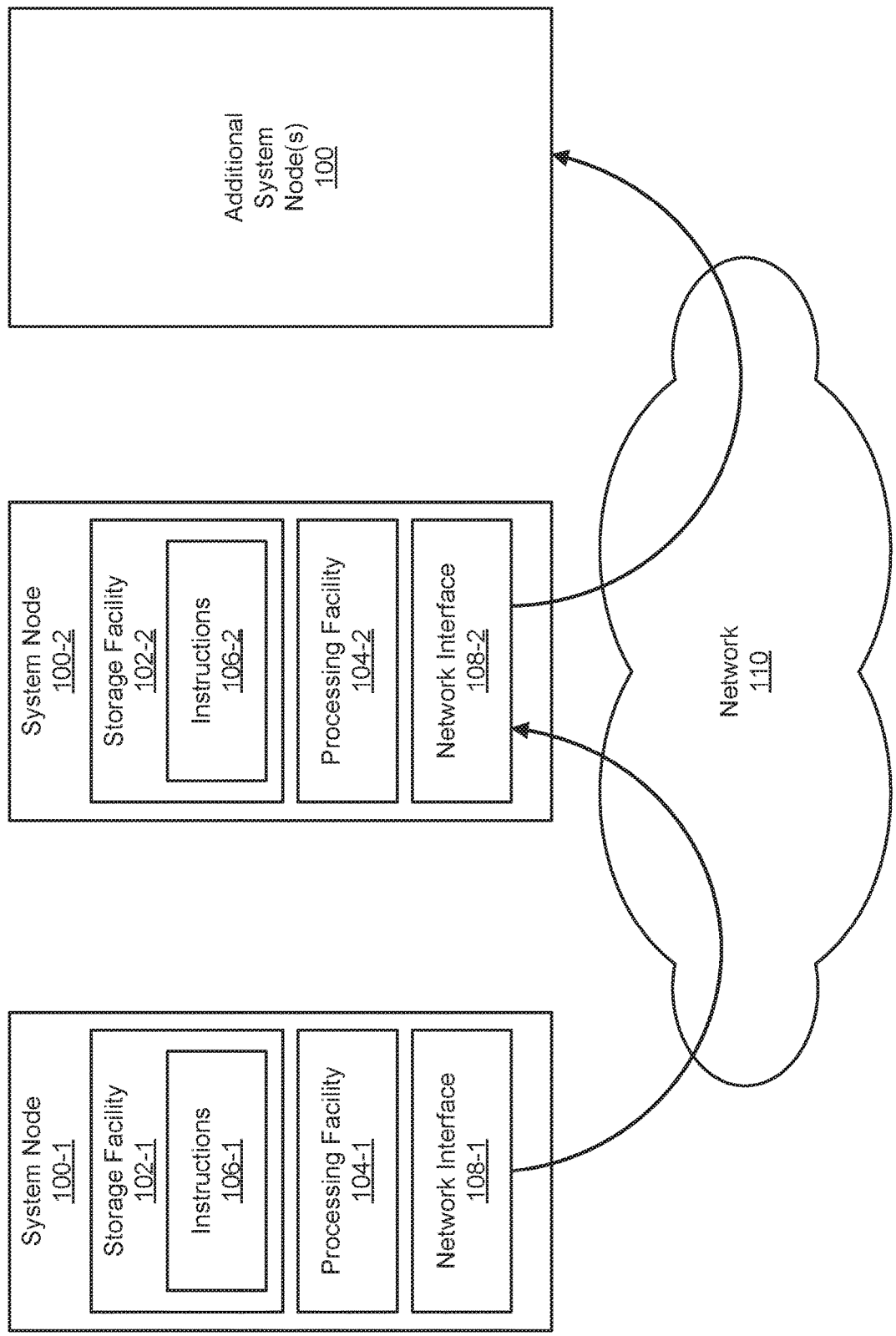
FIG. 1 illustrates an exemplary plurality of system nodes used for synchronizing frame processing within a multi-stage modular architecture according to embodiments described herein.

Systems and methods for synchronizing frame processing within a multi-stage modular architecture are described herein. As mentioned above, various large-scale processing tasks (e.g., including tasks associated with extended reality content generation) may require too much computing power to be reasonably performed by a single computing node or within a single stage. Accordingly, such tasks may be broken up so as to be performed by multiple computing nodes that make up multiple distinct computing stages in a computing pipeline. This type of arrangement in which multiple computing nodes are configured to operate in different stages to efficiently and effectively accomplish large-scale processing tasks is referred to herein as a multi-stage modular architecture. Such multi-stage modular architectures may be very useful for accomplishing large-scale tasks, particularly when each system node within the architecture can interoperate with other system nodes in an orderly and coordinated manner.

To this end, systems and methods described herein relate to ways of synchronizing system nodes in a multi-stage modular architecture. For example, such system nodes may be synchronized to perform frame processing tasks in lock step such that frames of a frame sequence (e.g., a video file, etc.) may be processed frame by frame in a modular pipeline that includes various different pipeline stages and various system nodes performing certain specific tasks in parallel at each stage.

For example, in one particular implementation, a first system node of a plurality of system nodes arranged in a multi-stage modular architecture may perform a first frame processing task on a first frame of a frame sequence, while a second system node of the plurality of system nodes may perform a second frame processing task on a second frame of the frame sequence. The multi-stage modular architecture may include a plurality of pipeline stages into which the plurality of system nodes are arranged, and the first system node may be included within a first pipeline stage of the multi-stage modular architecture while the second system node is included within a second pipeline stage of the multi-stage modular architecture. Different processing tasks that are to be performed on the frames as the frames pass through the pipeline may be associated with each of the plurality of pipeline stages. For instance, the first frame processing task may be associated with the first pipeline stage and the second frame processing task may be associated with the second pipeline stage. Certain specific examples of the types of frame processing tasks that may be performed at different pipeline stages will be described in more detail below.

Subsequent to performing the first frame processing task, the first system node may transmit the first frame to a first additional system node included within a pipeline stage that is subsequent to the first pipeline stage within the multi-stage modular architecture. Similarly, subsequent to performing the second frame processing task, the second system node may transmit the second frame to a second additional system node included within a pipeline stage that is subsequent to the second pipeline stage within the multi-stage modular architecture. In some examples, one of the first or second pipeline stages may be immediately adjacent to the other in the pipeline, while in other examples, these pipeline stages may be non-consecutive stages that feed into other pipeline stages. Specific examples of multi-stage modular architectures that include various system nodes arranged in various pipeline stages will be illustrated and described in more detail below.

In certain examples, the transmitting of the second frame by the second system node may be synchronized with the transmitting of the first frame by the first system node. For example, the transmitting of the second frame may be synchronized with the transmitting of the first frame so as to be performed within a predetermined threshold time of the transmitting of the first frame. In like manner, certain or all of the other system nodes included in the multi-stage modular architecture may also be synchronized with the first and second system nodes so as to transmit their respective frames in lock step with the first and second system nodes. For example, all of the system nodes in a multi-stage modular architecture may be synchronized so as to process a certain number of frames per second (e.g., 30 frames per second ("fps")) and to transmit each of these processed frames down the pipeline in lock step with the other system nodes so that all of the system nodes remain coordinated and in synchronization with one another.

The multi-stage modular architecture comprising the plurality of system nodes described above may be useful for various types of large-scale computing tasks, particularly those related to processing video frame by frame. To provide a more specific example of a particular large-scale computing task that may be performed by an implementation of the multi-stage modular architectures described herein, an exemplary system will now be considered that relates to extended reality content generation. In this example, the system includes a set of system nodes arranged in a multi-stage modular architecture. As will be described in more detail below, the set of system nodes in this example may include a variety of different types of system nodes. For example, the set of system nodes may include: 1) a set of image capture system nodes included within an image capture pipeline stage of the multi-stage modular architecture and each configured to capture and provide surface data representative of color and depth characteristics of surface points of an object located within a capture scene; 2) a set of point cloud generation system nodes included within a point cloud generation pipeline stage of the multi-stage modular architecture and each configured to generate respective point clouds based on the captured surface data; 3) a point cloud organizer system node included within a point cloud organizer pipeline stage of the multi-stage modular architecture and configured to consolidate point cloud data, from one or more of the respective point clouds generated by the set of point cloud generation system nodes, that corresponds to a surface of the object; 4) a voxelizer system node included within a voxelizer pipeline stage of the multi-stage modular architecture and configured to generate, based on the consolidated point cloud data for the object, a voxel grid representative of the object; and 5) a set of rendering system nodes included within a rendering pipeline stage of the multi-stage modular architecture and configured to generate, based on the voxel grid, a set of rendered patches each depicting at least a portion of the object.

In this exemplary implementation, each of the different types of system nodes may be synchronized and coordinated with one another according to the methods and systems described herein. For example, each system node of the set of system nodes may be further configured to transmit a respective frame (e.g., subsequent to performing a respective processing task on the respective frame) to a different system node that is included within a different pipeline stage within the multi-stage modular architecture. This transmitting of each respective frame by each system node of the set of system nodes may be performed synchronously so as to be performed within a predetermined threshold time of the transmitting of the other respective frames by each of the other system nodes of the set of system nodes. For instance, all of the system nodes in the set of system nodes may be configured to transmit their respective frames to other respective system nodes down the pipeline within about 1.0 microsecond ("µs") of one another, or another suitable predetermined threshold time. Examples of such synchronized transmissions will be illustrated and described in more detail below.

Methods and systems described herein for synchronizing frame processing within a multi-stage modular architecture may provide various benefits and advantages for users of the methods and systems, as well as for the computing tasks being performed by way of the methods and systems. For example, by employing frame synchronization schemes such as described herein, very large-scale and complex tasks may be modularized and broken up so as to be performed efficiently and effectively by a plurality of system nodes. In this way, very short latency times and high data throughput may be accomplished for the tasks by employing a set of computing nodes that includes powerful computing resources (e.g., an ample number of powerful servers, etc.) that are capable of satisfying throughput and latency parameters called for by a particular application. For instance, the set of computing nodes may include local computing resources, multi-access edge compute ("MEC") resources, cloud-based computing resources, and/or other such computing resources as may serve a particular implementation.

In the case of an implementation that generates extended reality content, methods and systems described herein for synchronizing frame processing may enable systems arranged in the multi-stage modular architectures described herein to operate synchronously regardless of how many system nodes may be included in the systems. As such, the systems may be arbitrarily scalable such that any size of extended reality world can be processed and generated with any desired degree of quality given enough computing resources.

Ultimately, regardless of the application or task that is to be performed, methods and systems and multi-stage modular architectures described herein may allow for arbitrary numbers of separate, independent computing nodes (e.g., different servers, etc.) to cooperate in performing one or more large-scale tasks, and these nodes may perform the tasks efficiently and effectively by dividing the problem up into pipeline stages, parallelizing the work at each pipeline stage, and remaining synchronous with one another using the methods and systems described herein. In this way, systems may include hundreds or even more system nodes (e.g., cameras, servers, devices, etc.) that are all coordinated to interoperate efficiently in lock step.

Various embodiments will now be described in more detail with reference to the figures. The disclosed methods and devices may provide one or more of the benefits mentioned above and/or various additional and/or alternative benefits that will be made apparent herein.

FIG. 1 illustrates an exemplary plurality of system nodes 100 (e.g., system node 100-1, system nodes 100-2, and zero or more additional system nodes 100) used for synchronizing frame processing within a multi-stage modular architecture. As shown, each system node 100 may include, without limitation, a storage facility 102 (i.e., storage facility 102-1 in system node 100-1, storage facility 102-2 in system node 100-2, and respective implementations of storage facilities 102 not explicitly shown in the additional system nodes 100), and a processing facility 104 (i.e., processing facility 104-1 in system node 100-1, processing facility 104-2 in system node 100-2, and respective implementations of processing facilities 104 not explicitly shown in the additional system nodes 100) that are selectively and communicatively coupled to one another.

The respective facilities 102 and 104 may each include or be implemented by hardware and/or software components (e.g., processors, memories, communication interfaces, instructions stored in memory for execution by the processors, etc.). In some examples, facilities 102 and 104 may be distributed between multiple computing devices or components (e.g., multiple processors, circuit boards, etc.), but, as will be described in more detail below, each system node 100 may represent a consolidated, independent node of the overall system (e.g., a standalone computer in a discrete housing, an independent server computer housed with other server computers in a rack configuration, or any of other suitable form factors) that is located at one particular location (e.g., rather than being distributed across multiple computing systems in multiple locations). Each of facilities 102 and 104 within the system node 100 implementations of FIG. 1 will now be described in more detail.

Each storage facility 102 may store and/or otherwise maintain executable data used by a respective processing facility 104 to perform any of the functionality described herein. For example, the storage facility 102 of a particular system node 100 may store instructions 106 (i.e., instructions 106-1 in system node 100-1, instructions 106-2 in system node 100-2, and respective sets of instructions 106 not explicitly shown in the additional system nodes 100) that may be executed by the processing facility 104 of the particular system node 100. Each set of instructions 106 may be executed by a respective processing facility 104 to perform any of the functionality described herein, and may be implemented by any suitable application, software, code, and/or other executable data instance. Additionally, each storage facility 102 may also maintain any other data accessed, managed, generated, used, and/or transmitted by the respective processing facility 104 in a particular implementation.

Each processing facility 104 may be configured to perform (e.g., by executing the respective instructions 106 stored in the respective storage facility 102) various functions associated with synchronizing frame processing within a multi-stage modular architecture. For example, system node 100-1 may be included within a first pipeline stage of a multi-stage modular architecture, and processing facility 104-1 may be configured to perform a first frame processing task (e.g., a frame processing task associated with the first pipeline stage) on a first frame of a frame sequence. Processing facility 104-1 may further be configured to transmit, subsequent to performing the first frame processing task, the first frame to a first additional system node included within a pipeline stage subsequent to the first pipeline stage within the multi-stage modular architecture. For instance, in an example in which the pipeline stage subsequent to the first pipeline stage is a second pipeline stage in which system node 100-2 is included, processing facility 104-1 may transmit the first frame by way of a network interface 108-1 of system node 100-1, through a network 110, to be received by a network interface 108-2 of system node 100-2.

Within system node 100-2 of the second pipeline stage of the multi-stage modular architecture, processing facility 104-2 may be configured to perform a second frame processing task (e.g., a frame processing task associated with the second pipeline stage) on a second frame of the frame sequence. For example, the second frame of the frame sequence may be a frame that was processed by system node 100-1 during the last synchronized cycle before being transmitted to system node 100-2 by way of network interfaces 108-1 and 108-2 and network 110. Subsequent to performing the second frame processing task, processing facility 104-2 may transmit the second frame to a second additional system node included within a pipeline stage subsequent to the second pipeline stage within the multi-stage modular architecture. For instance, in an example in which the pipeline stage subsequent to the second pipeline stage is a third pipeline stage in which at least one of the additional system nodes 100 is included, processing facility 104-2 may transmit the second frame by way of network interface 108-2, through network 110, to be received by a network interface (not explicitly shown) of the additional system node 100.

The frame processing tasks performed by each of the processing facilities 104 at each pipeline stage may include any computing tasks in which an image frame (e.g., a color data frame, a depth data frame, a surface data frame that includes both color data and depth data, etc.) is accepted as input and used to modify the input frame, to update a model based on the input frame, to add the input frame to an atlas image, to render an output frame based on the input frame (e.g., render an image from a different vantage point, etc.), or the like. Various specific examples of different types of frame processing tasks performed by different types of system nodes included in different pipeline stages of a multi-stage modular architecture will be described below in relation to FIGS. 8 through 10.

As each of the processing facilities 104 of the various system nodes 100 process and transmit respective frames of the frame sequence in these or other suitable ways, the transmissions may be synchronized to allow the different system nodes to interoperate effectively and efficiently. Specifically, for example, the transmitting of the second frame by processing facility 104-2 may be synchronized with the transmitting of the first frame by processing facility 104-1 so as to be performed within a predetermined threshold time (e.g., about 1.0 µs, etc.) of the transmitting of the first frame. Similarly, each of the additional system nodes 100 that may also be included in the multi-stage modular architecture may be synchronized to process and transmit frames in lock step with system nodes 100-1 and 100-2 in like manner.

Each respective network interface 108 of the system node 100 implementations in FIG. 1 may be configured to queue up and transmit full frames of a frame sequence (e.g., a video file, etc.) in any suitable way and using any suitable standards or technologies. For example, the transmitting of each of the frames of the frame sequence that have been processed by a particular system node 100 (e.g., including the first and second frames described above as being processed by system nodes 100-1 and 100-2) may be performed by way of an Ethernet network interface, an InfiniBand network interface, or any other network interface (e.g., a Fibre Channel interface, an Omni-Path interface, etc.) that is configured to transmit, in a single transmission rather than incrementally over multiple transmissions, an entire frame of the frame sequence. For example, each network interface 108 may be configured to transmit, in a single transmission, any frame included in the frame sequence (i.e., up to and including the largest frame in an example where some frames are larger than others within the frame sequence).

Certain network interfaces may be required for use with certain sizes of frames that are to be transmitted, and it will be understood that some network interface technologies may not be well-adapted to function with methods and systems described herein, at least for larger frame sizes. For instance, as a consequence of throughput limitations of certain network interfaces, these network interfaces may not be employed as network interfaces 108 unless a particular implementation is only designed to process relatively small frames. As one specific example, a serial digital interface ("SDI") network interface may be employed for relatively small frames (e.g., standard definition frames, high-definition frames, etc.) but, because it may not support single transmissions of entire frames of an 8 k or 12 k resolution, for instance, the SDI network interface may be unsuitable for use in systems configured to process frames of such high resolution.

As will be described in more detail below, another factor that may be considered in selecting a networking technology for use in network interfaces 108 is whether the technology is configured to work with time synchronization schemes and protocols such as the IEEE 1588 Precision Time Protocol ("PTP") standard. In implementations in which such protocols are employed for synchronizing each of the system nodes 100 together, certain network equipment may be included within network 110 and/or within individual network interfaces 108 of the system nodes 100 to facilitate or bolster the functionality or accuracy of the protocol. For example, an Ethernet router or an Infiniband switch within network 110 (and to which network interfaces 108 communicate) may be implemented as a PTP boundary clock that is configured to self-account for delays that the router or switch imposes on data being transferred through the router or switch. Such boundary clocks are optional for a given implementation of the multi-stage modular architectures described herein, but it will be understood that they may provide certain benefits including highly accurate time synchronization when employed.

In various implementations, network 110 may include or be implemented by wired local area network ("LAN") such as an Ethernet or Infiniband network, or by another suitable wired or wireless network or networks that comport with the criteria and factors described herein. To this end, network 110 may implement or employ any suitable communication technologies, devices, media, protocols, or the like as may serve a particular implementation.

In order to transmit frames in lock step at precise times defined by trigger patterns established in ways that will be described in more detail below (e.g., within predetermined threshold times of when other transmissions are also occurring), each system node 100 may, in certain implementations, employ a real-time operating system configured to operate in real time or near real time. Real-time operating systems allow for instructions to be performed at very precise times and are therefore convenient for implementing the synchronous transmissions described herein and may be used in certain implementations. However, real-time operating systems also tend to be low-level operating systems configured for relatively simplistic embedded systems that may not be well-adapted for performing many of the frame processing tasks described herein. As such, it may be convenient or necessary in many implementations for each system node 100 to employ a general-purpose operating system (e.g., a Linux-based operating system, a Unix-based operating system, a Windows-based operating system, etc.) rather than a real-time operating system, even though general-purpose operating systems are susceptible to delays (e.g., due to context switches from priority inversions, scheduling delays at the kernel level, buffering delays, etc.) that may make it more difficult to orchestrate frame transmissions to occur at precise times. In these examples, processing facilities 104 may each employ one or more processing threads that are assigned real-time priority to cause events such as frame transmissions to occur at precise times. Such real-time prioritized threads may be configured to achieve the same end goals of timing precision as would otherwise be convenient to implement using real-time operating systems.

While system nodes 100-1 and 100-2 and certain other system nodes 100 in FIG. 1 have been described as each being part of different pipeline stages, it will be understood that, in certain examples, each pipeline stage may include a plurality of system nodes operating in parallel and synchronized with one another and with other system nodes of other pipeline stages. Specifically, for example, the first pipeline stage may further include, along with system node 100-1, one or more of the additional system nodes 100 that are configured to perform the first frame processing task on additional respective frames of one or more additional frame sequences. Similarly, the second pipeline stage may further include, along with system node 100-2, one or more of the additional system nodes 100 that are configured to perform the second frame processing task on the additional respective frames of the one or more additional frame sequences. These additional system nodes included in the first and second pipeline stages may be configured to transmit the additional respective frames in synchronization with the transmitting of the first and second frames by system nodes 100-1 and 100-2, respectively, such that the transmitting of the additional respective frames occurs within the predetermined threshold time of the transmitting of the first and second frames.

Figure 2:
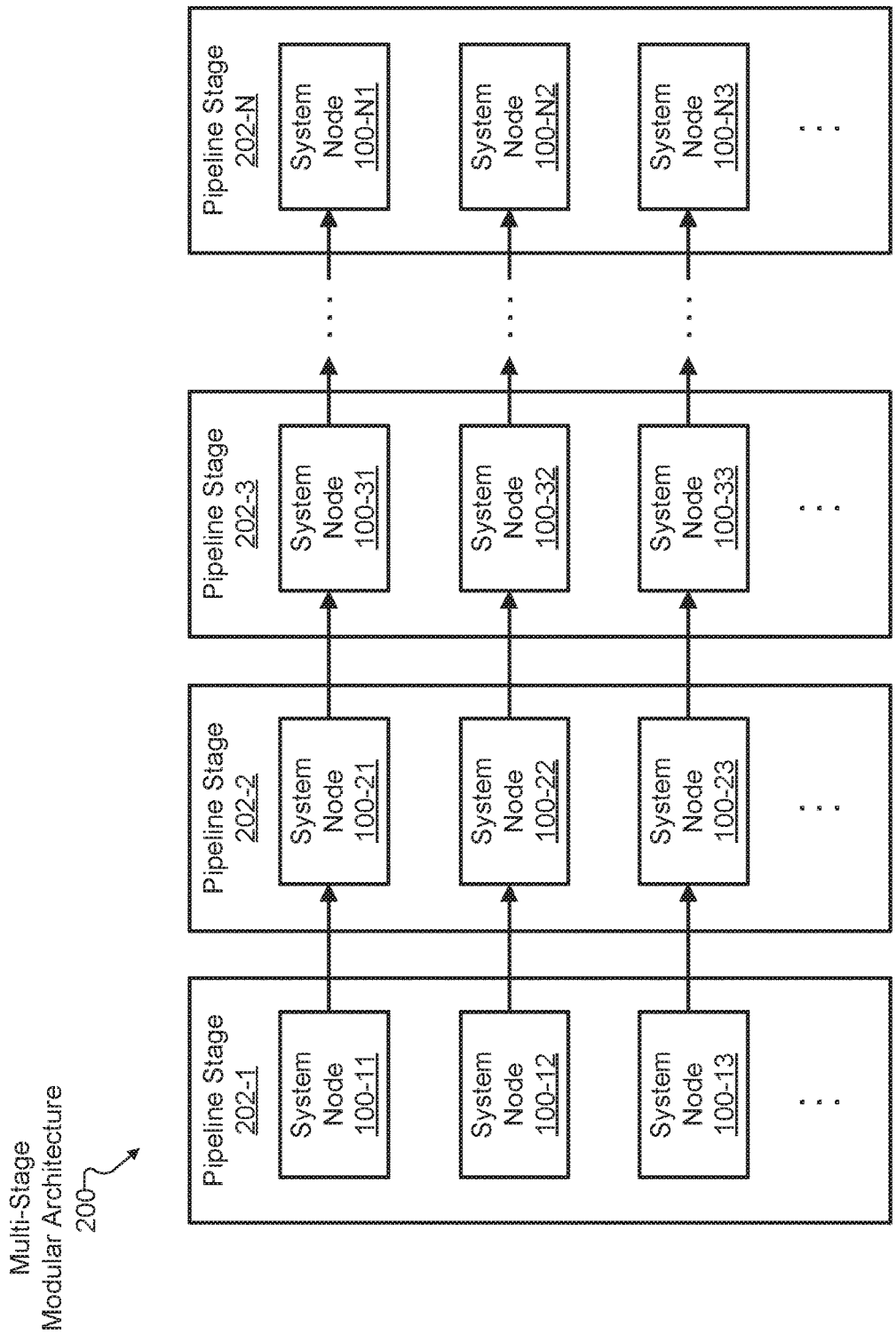
FIG. 2 illustrates an exemplary multi-stage modular architecture including a plurality of the system nodes of FIG. 1 arranged in a plurality of pipeline stages according to embodiments described herein.

To illustrate such an implementation, FIG. 2 shows an exemplary multi-stage modular architecture 200 that includes a plurality of system nodes 100 (i.e., each of the system nodes labeled "100-$xy$," where x represents a pipeline index of the system node 100 and y represents a node index of the system node 100). Each of the system nodes 100 included in multi-stage modular architecture 200 are shown to be arranged in a plurality of pipeline stages 202 (pipeline stages 202-1 through 202-N), each of which may be associated with a particular frame processing task. Specifically, pipeline stage 202-1 includes system nodes 100-1$y$ (i.e., system nodes 100-11, 100-12, 100-13, and other system nodes 100-1$y$ that are not explicitly shown) and will be understood to be associated with a first frame processing task, pipeline stage 202-2 includes system nodes 100-2$y$ (i.e., system nodes 100-21, 100-22, 100-23, and other system nodes 100-2y that are not explicitly shown) and will be understood to be associated with a second frame processing task, and so forth up to pipeline stage 202-N, which includes system nodes 100-Ny (i.e., system nodes 100-N1, 100-N2, 100-N3, and other system nodes 100-Ny that are not explicitly shown) and will be understood to be associated with an Nth frame processing task (where N represents any suitable number of stages as may be included in a particular implementation of multi-stage modular architecture 200).

As represented by arrows from node to node in FIG. 2, each of system nodes 100 in multi-stage modular architecture 200 may be configured to receive frames for processing at the beginning of each synchronization cycle during which the system nodes operate (e.g., each 33.3 millisecond period of time for an example in which frame sequences being processed have a frame rate of 30 fps), and to transmit their respective processed frames to a system node 100 in a subsequent pipeline stage 202 right when each synchronization cycle ends (and as the next synchronization cycle begins). As shown, the only exceptions to this are system nodes 100-1y, which generate frames rather than receiving frames, and system nodes 100-Ny, which consume frames rather than transmitting the frames to subsequent pipeline stages. For example, as will be described in more detail below for a specific implementation of multi-stage modular architecture 200, pipeline stage 202-1 may be associated with capturing frame sequences (e.g., by way of system nodes 100-1y that are implemented as image capture system nodes including video cameras and so forth), while pipeline stage 202-N may be associated with presenting processed frame content to a user (e.g., by rendering content to a display screen, by transmitting rendered imagery to a media player device used by the user, etc.).

Each of system nodes 100 in FIG. 2 will be understood to represent a respective implementation of the system nodes 100 described above in relation to FIG. 1. As such, it will be understood that each system node 100 may be implemented as a computing system or device that, while communicatively coupled to and interoperative with other system nodes in the architecture, is configured as an independent system with its own independent computing resources (e.g., processing facilities, storage facilities, network interfaces, local system clocks, etc.) and, in some examples, its own standalone housing or enclosure. For example, each system node 100 may be implemented as a standalone image capture device (e.g., a video camera located at a particular vantage point with respect to a real-world scene to capture the real-world scene from the particular vantage point), as a server computing device (e.g., a MEC server, a cloud server, etc.), as a desktop or laptop computing device, as a user equipment device (e.g., a media player device such as a mobile phone or tablet used by a user), or the like. While, as described above, it may be desirable for different independent system nodes to interoperate to perform a large-scale computing task, this independence of the different system nodes may make it unfeasible for the different system nodes to rely on a common global clock. Instead, each system node 100 may include a local system clock that is relied on only by that system node 100 and that, in certain implementations, is to be synchronized with a global clock.

As used herein, system nodes meeting the criteria described above will be referred to as "modular" system nodes, and it will be understood that all system nodes 100 referred to herein are modular system nodes in this sense. As a result, a multi-stage modular architecture such as multi-stage modular architecture 200 shown in FIG. 2 will be understood to be "modular" in the sense that the architecture is composed of a plurality of modular system nodes 100, and to be "multi-stage" as a result of the plurality of pipeline stages 202 into which the system nodes 100 are arranged. As has been mentioned, a specific multi-stage modular architecture implementing multi-stage modular architecture 200 and configured to perform a large-scale computing task related to generating extended reality content will be described in more detail in relation to FIGS. 8-10 below.

Systems nodes 100 of multi-stage modular architecture 200 may each process and pass along frame after frame of one or more frame sequences in order to generate and process the frame sequences and/or other content (e.g., extended reality content) that is based on the frame sequences. To this end, the synchronized frame transmissions may occur repeatedly such that frame sequences may be processed through all of pipeline stages 202 of multi-stage modular architecture 200. Specifically, for example, each of system nodes 100 shown in FIG. 2 may be configured to perform periodic frame transmissions (e.g., including the transmitting of the respective frames described above) at frame transmit times defined by a frame-driven trigger pattern.

Figure 3:
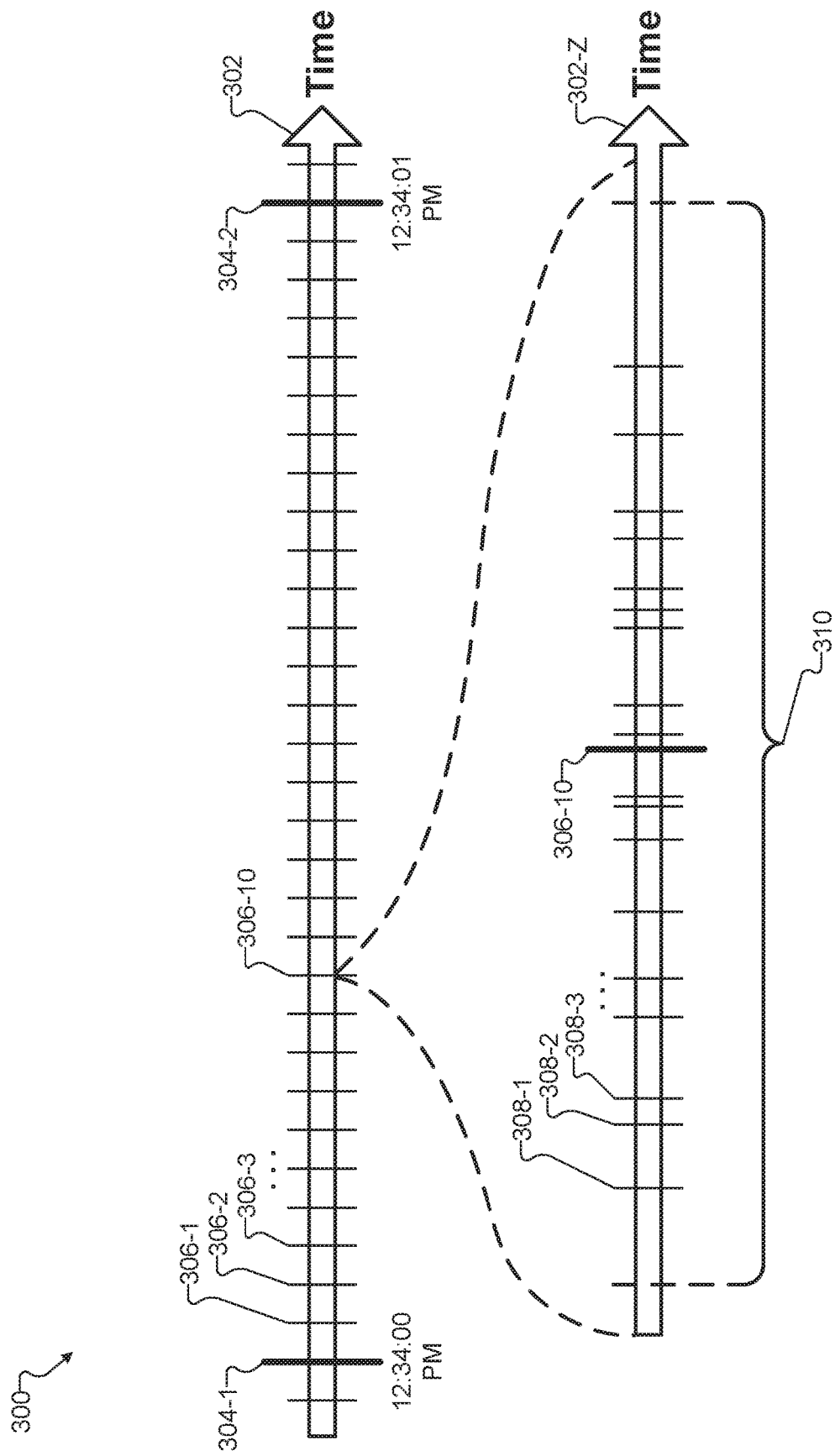
FIG. 3 illustrates an exemplary frame-driven trigger pattern that may be used for synchronizing frame processing within a multi-stage modular architecture according to embodiments described herein.

To illustrate, FIG. 3 shows an exemplary frame-driven trigger pattern 300 that may be used for synchronizing frame processing within a multi-stage modular architecture such as multi-stage modular architecture 200. As shown, frame-driven trigger pattern 300 is drawn on a timeline 302 that will be understood to be representative of the flow of time while a large-scale computing task (e.g., the generation of extended reality content or another suitable large-scale computing task) is being performed. Most of the portion of timeline 302 shown in FIG. 3 represents a one-second period of time between a time 304-1 (at 12:34:00 PM as labeled) and a time 304-2 (at 12:34:01 PM, as labeled). In this example, frame-driven trigger pattern 300 will be understood to correspond to a frame rate of 30 fps. As such, the one-second period between times 304-1 and 304-2 (hereafter referred to as time period 304) is shown to be divided into thirty synchronization cycles during which individual frames are processed and transmitted and each of which begin with a frame transmit time 306 (i.e., frame transmit times 306-1, 306-2, 306-3, and so forth, only a few of which are explicitly labeled in FIG. 3). While not explicitly labeled as such, it will be understood that times 304-1, 304-2, and other times falling right at the beginning of a new second may also serve as frame transmit times 306 in this example.

Frame transmit times 306 are defined by frame-driven trigger pattern 300 and serve as a pulse or heartbeat for the entire system (i.e., all of the system nodes 100 in a particular implementation of multi-stage modular architecture 200). That is, each of the system nodes 100 included in multi-stage modular architecture 200 may be configured to perform their periodic frame transmissions at each frame transmit time 306 defined by frame-driven trigger pattern 300 by using, for example, a real-time operating system or a general-purpose operating system that employs threads with real-time priority, as has been described. At each instant when a frame transmit time 306 occurs, each given system node 100 is configured to transmit a frame that has been processed during the previous synchronized cycle (e.g., to another system node 100 in a subsequent pipeline stage 202, to a jitter buffer as will be described in more detail below, etc.), receive a frame that is to be processed during the new synchronized cycle (e.g., from another system node 100 in a preceding pipeline stage 202), and process the frame in accordance with the frame processing task associated with the pipeline stage within which the system node 100 is included so that the new frame will be processed and ready for transmission by the end of the current cycle (i.e., by the next frame transmit time 306).

Each system node 100 may be triggered in accordance with frame-driven trigger pattern 300 to process and transmit frames according to the synchronized periods defined by the pulse of frame transmit times 306, and, in this way, each system node 100 may remain synchronized and coordinated with one another in interoperating to perform the large-scale computing task. While it may not be feasible for every system node 100 to transmit a respective frame at precisely the same instant, methods and systems described herein may guarantee that each system node 100 transmits its respective frame within a predetermined threshold time of the frame transmit time 306 and/or of the transmission time of all the other frames being transmitted.

To illustrate, a zoomed-in portion of timeline 302 (labeled as portion 302-Z in FIG. 3) is shown below the principal drawing of timeline 302 in FIG. 3. Portion 302-Z of timeline 302 is shown to be zoomed in on the time immediately preceding and following frame transmit time 306-10. Right around frame transmit time 306-10 (immediately before, at, and immediately after), various actual transmission times 308 are shown (i.e., actual transmission times 308-1, 308-2, 308-3, and so forth, only a few of which are explicitly labeled in FIG. 3). As illustrated, actual transmission times 308 are not all precisely simultaneous when the timeline is examined in such a zoomed-in manner, and in fact do not necessarily occur in accordance with any identifiable pattern. Each of the actual transmission times 308 do, however, occur within a predetermined time 310 of frame transmit time 306-10. Because predetermined time 310 may be relatively small (e.g., 1.0 μs in one example, which would make up only a small fraction of 1% of the total synchronization cycle time for this 30 fps example), however, each system node 100 may be configured to operate with a built-in assumption that the frames are all processed and transmitted perfectly simultaneously. While predetermined time 310 is illustrated in FIG. 3 as being centered around frame transmit time 306-10, it will be understood that, in other examples, predetermined time 310 may be defined as a measure of time between the first and last actual transmission times 308 to occur, may be defined as a period of time before and a (potentially different) period of time after frame transmit time 306-10, or may be defined in any other manner as may serve a particular implementation.

Frame-driven trigger pattern 300 may be configured to trigger synchronous frame transmission for frames having arbitrary pixel resolution and/or other characteristics. This feature of frame-driven trigger pattern 300 may be advantageous over other types of trigger patterns (e.g., trigger patterns that define frame transmit times for particular pixels, for horizontal lines of images, etc.) because this frame-based nature of the trigger pattern allows the synchronization system to be agnostic to frame resolution and other format characteristics, thereby allowing the system nodes 100 of multi-stage modular architecture 200 to operate with any arbitrary frame formats and resolutions. In some examples, different system nodes 100 of multi-stage modular architecture 200 may be configured to simultaneously process frames with different frame formats and resolutions, all while remaining synchronized with the other system nodes 100 of the architecture.

In order to transmit frames synchronously as illustrated in FIG. 3, each system node 100 in multi-stage modular architecture 200 may be triggered or synchronized with one another in any suitable manner. To illustrate, FIGS. 4 and 5 show different exemplary synchronization techniques that a multi-stage modular architecture such as multi-stage modular architecture 200 may employ to implement the synchronization described above.

Figure 4:
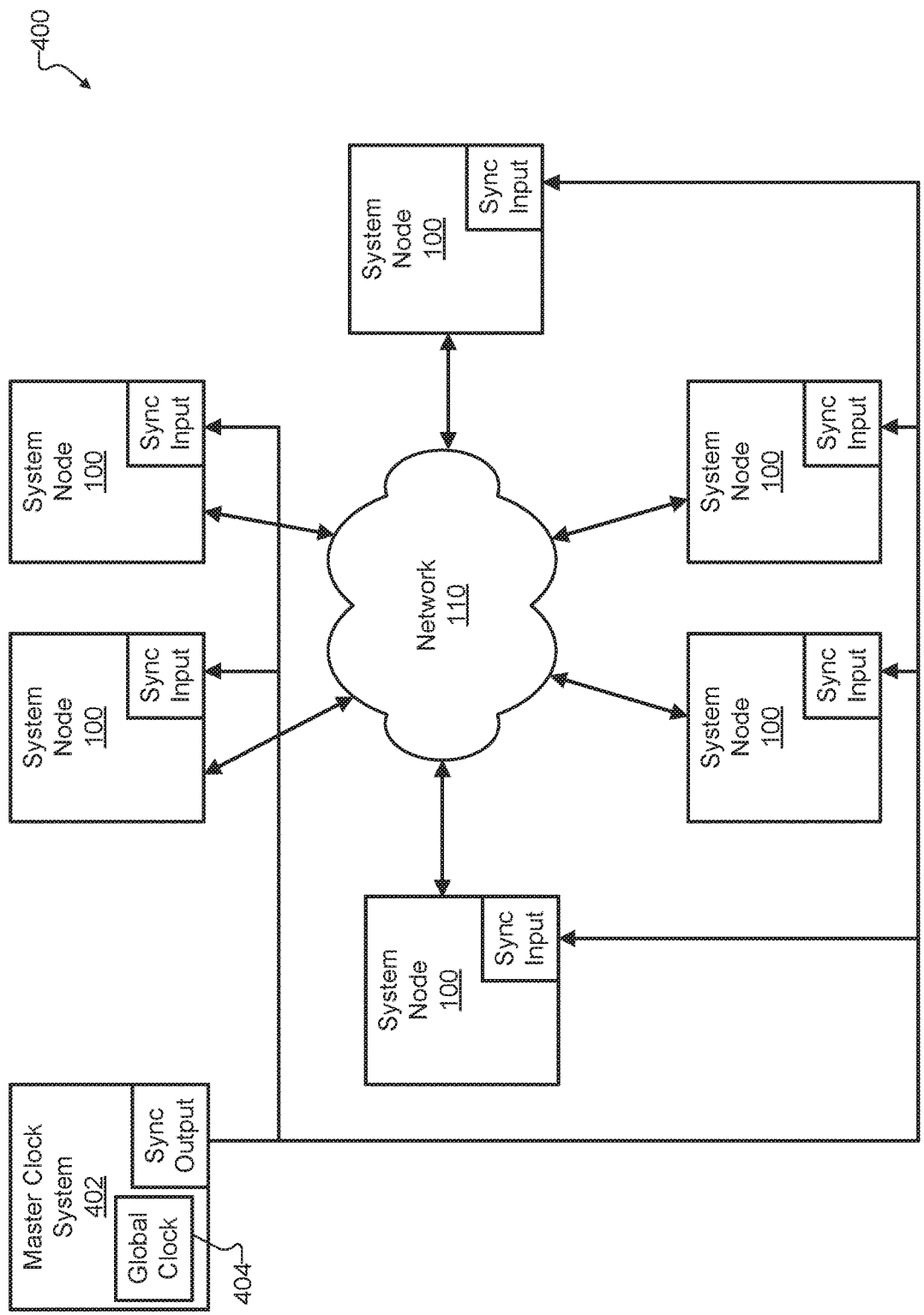
FIGS. 4-5 illustrate different exemplary synchronization techniques that a multi-stage modular architecture may employ according to embodiments described herein.
Figure 5:
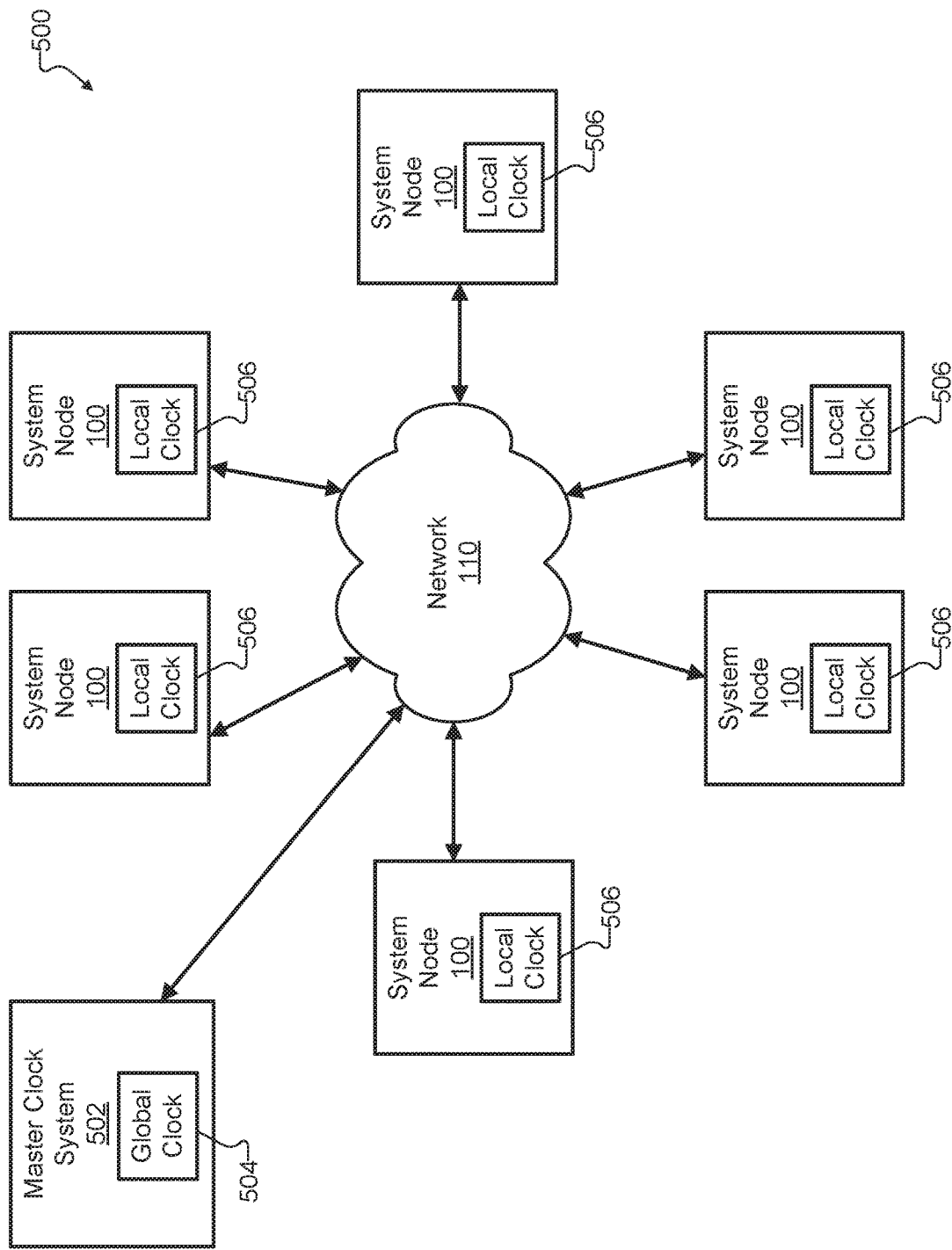

Referring first to FIG. 4, for example, a signal-trigger-based synchronization technique 400 is shown for a configuration including a master clock system 402 and a plurality of system nodes 100 that are all communicatively coupled to network 110 (which, as described above, may include one or more network routers, switches, and/or other network equipment) in a star configuration. Each of systems nodes 100 shown in FIG. 4 will be understood to represent an implementation of one of the system nodes 100 that have been described above, and master clock system 402 will be understood to represent any suitable clocking system node such as a dedicated clocking system node, one of the regular system nodes 100 that has been designated to serve as the master clock system, or another clocking system node as may serve a particular implementation.

As shown, master clock system 402 includes a global clock 404 that is designated to serve as a master clock with which all of the system nodes 100 are to perform in synchronization. As such, a frame-driven trigger pattern implemented for the architecture (such as frame-driven trigger pattern 300) may be defined based on the time kept by global clock 404, rather than by any other clock such as any local clock that may be included in any of the system nodes 100. Master clock system 402 may implement the frame-driven trigger pattern based on global clock 404 by providing a hardware signal trigger to each of the system nodes 100 at each frame transmit time defined within the frame-driven trigger pattern. To this end, as shown, hard-wired trigger lines between a "Sync Output" port of master clock system 402 and respective "Sync Input" ports of each of the system nodes 100 may be provided (e.g., wired up) when the multi-stage modular architecture is initially set up and configured.

Certain networking protocols (e.g., SDI, etc.) may be well-adapted to employ a synchronization technique like signal-trigger-based synchronization technique 400, and this mode of synchronization may thus be advantageously used in such implementations. However, as has been mentioned above, certain implementations configured to process frame sequences with larger resolutions than can be provided by such protocols may more advantageously use Ethernet, Infiniband, or other higher bandwidth protocols for which it is not efficient or convenient to employ hard-wired trigger lines such as shown in FIG. 4. Moreover, it may be inconvenient or otherwise undesirable for large, multi-stage modular architectures configured to handle high-resolution frames using large numbers of system nodes to require the hardwiring of trigger lines, the compensation for trigger travel times, and so forth.

Consequently, FIG. 5 shows an alternative manner of synchronizing a plurality of systems nodes 100 in a multi-stage modular architecture such as multi-stage modular architecture 200. Specifically, a local-clock-based synchronization technique 500 is shown whereby a master clock system 502 that includes a global clock 504 is used to synchronize respective local clocks 506 of each of the system nodes 100 included in the multi-stage modular architecture. As with FIG. 4, each of the systems nodes 100 shown in FIG. 5 will be understood to represent an implementation of one of the system nodes 100 that have been described above, and master clock system 502 will be understood to represent any suitable clocking system node such as a dedicated clocking system node, one of the regular system nodes 100 that has been designated to serve as the master clock system, or another clocking system node as may serve a particular implementation.

FIG. 5 shows that, in local-clock-based synchronization technique 500, no hardwired trigger lines or dedicated trigger input and output ports (e.g., such as the "Sync Output" and "Sync Input" ports shown in FIG. 4) are required, thereby already making local-clock-based synchronization technique 500 advantageous over signal-trigger-based synchronization technique 400 in certain respects (e.g., by reducing the wiring that must be performed in set up, by reducing error points, and by otherwise simplifying the overall system). Instead, as shown, local-clock-based synchronization technique 500 may use one or more network synchronization protocols to synchronize each local clock 506 to global clock 504 using standard network messages communicated by way of network 110 (rather than using any dedicated trigger lines). Additionally, local-clock-based synchronization technique 500 may use other synchronization protocols to define frame-driven trigger patterns that can be shared between all of the system nodes 100 once all the local clocks 506 are synchronized (i.e., once, for example, 12:34:00 is considered to be the same moment for master clock system 502 and for each of the system nodes 100).

In examples employing local-clock-based synchronization technique 500, each system node 100 may be configured to synchronize its respective local clock 506 to global clock 504, which, as mentioned above, may serve as the master clock for the entire multi-stage modular architecture. Accordingly, the transmitting of the respective frames being processed by each system node 100 at each frame transmit time of a particular frame-driven trigger pattern may be synchronized with the transmitting of all the other frames by the other system nodes 100 based on the synchronizing of all the local clocks 506 of the system nodes 100 to global clock 504.

Any suitable networking standards, protocols, or other technologies may be employed by master clock system 502 and the system nodes 100 in a particular multi-stage modular architecture to carry out the synchronization of local clocks 506 to global clock 504 (referred to herein as "time synchronization") and to synchronize each system node 100 to transmit frames according to a common frame-driven trigger pattern such as frame-driven trigger pattern 300 (referred to herein as "frame synchronization"). As one example, the synchronizing of local clocks 506 to global clock 504 may be performed by way of a time synchronization scheme that allows multiple local clocks of multiple system nodes to become synchronized with one another by transmitting network messages, accounting for the travel and processing time of the network messages, and so forth. For instance, the Precision Time Protocol synchronization method set forth in the IEEE 1588 standard may serve as one suitable such message-based time synchronization scheme.

A message-based time synchronization scheme such as IEEE 1588 PTP may be configured to select which clock is to be used as a grandmaster clock in the synchronization scheme (i.e., the global clock to which the local clocks of the other nodes are to be synchronized) using a best master clock ("BMP") algorithm defined by the standard. Global clock 504 of master clock system 502 may be selected as the grandmaster clock by the BMP algorithm as a result of that clock being more accurate or otherwise preferable to the other local clocks, and/or as a result of one or more other suitable factors accounted for by the BMP algorithm. Thereafter, and also in accordance with standards for message-based time synchronization schemes (e.g., the PTP standard), master clock system 502 may communicate a series of messages to each system node 100 by way of network 110 to thereby direct each system node 100 to continuously update its own local clock 506 to become and remain synchronized with global clock 504. As mentioned above, certain elements of network interfaces implemented in each system node 100 and in network 110 may be configured to bolster or facilitate the synchronization scheme in certain ways. For example, an Ethernet or InfiniBand network interface by way of which system nodes 100 communicate on network 110 may be implemented by networking equipment that includes a router configured to implement an IEEE 1588 PTP boundary clock or a similar boundary clock for another suitable synchronization standard or scheme. In this example, the router may account for the delay time that the router itself adds to the communication of messages (e.g., packets sent between master clock system 502 and particular system nodes 100) that are routed by the router.

Once the respective local clocks 506 of each of the system nodes 100 are synchronized with global clock 504 (and as local clocks 506 are continuously updated and kept synchronized as over time they stray slightly from global clock 504), one or more frame synchronization schemes may be used to define and communicate the frame-driven trigger pattern that each system node 100 is to use to thereby direct each system node 100 to transmit frames at precisely synchronized frame transmit times with the other system nodes. For example, each frame transmit time at which the synchronized transmitting of the frames is performed by the system nodes 100 may be defined by way of a frame synchronization scheme such as is defined by the SMPTE 2059 synchronization standard.

Frame synchronization schemes such as defined by various SMPTE 2059 standards (e.g., SMPTE 2059-1, 2059-2, etc.) may be configured to interoperate with time synchronization schemes such as defined by the IEEE 1588 PTP standard, and may be specially configured for video synchronization. It will be understood that other suitable standards and synchronization schemes may be employed when similar synchronization is implemented for other types of non-frame-based media or for other synchronization applications. As one example of a frame synchronization scheme, SMPTE 2059-1 may be employed to calculate a next vertical event at a particular SMPTE frequency in terms of a PTP counter. For instance, the next vertical event may be defined based on a frame rate of the frame sequence and may be used as a frame transmit time at which each system node 100 transmits a respective frame. As another exemplary frame synchronization scheme, SMPTE 2059-2 may define PTP synchronization parameters and metadata for timecode generation of system nodes 100 whose local clocks 506 are being updated in the PTP synchronization scheme. For example, SMPTE 2059-2 may define a synchronization parameter for new devices, may define the accuracy between two devices to be particular value (e.g., 1.0 μs), and so forth.

In order to keep up with timing requirements set forth by a particular frame-driven trigger pattern, each system node 100 may be configured to process a frame, on average, in no more time than is allowed by the frame rate and the frame-driven trigger pattern. For example, if a frame rate of a particular frame sequence is 30 fps in one example, each system node in a multi-stage modular architecture may be configured to be able to keep up with processing no fewer than 30 frames per second, or, in other words, to require no more than approximately 33.3 milliseconds of frame processing time per frame on average. However, even if a particular system node 100 may be capable of keeping up and meeting this average time requirement, certain circumstances may at times cause the particular system node 100 to fail to complete the frame processing task for one particular frame prior to the frame transmit time when the frame is scheduled to be transmitted to the next system node in the subsequent pipeline stage.

In these examples, the particular system node 100 may be capable of getting "caught up" by completing not only the frame processing task of the particular frame soon after the frame transmit time, but also then completing the frame processing tasks for subsequent frames prior to their respective frame transmit times. However, even if the particular system node 100 is capable of getting caught up in this way, the system node 100 may have no choice but to transmit a black frame or to retransmit a previous frame or the like if the frame transmit time occurs and the frame processing task is not yet complete for the proper frame scheduled to be transmitted at the frame transmit time. This approach of transmitting black frames or copies of previous frames may be convenient and appropriate to implement in certain multi-stage modular architecture implementations, such as implementations requiring very low latency and/or implementations in which the nature of the system nodes and respective frame processing tasks is such that it is very rare for any frame processing task to not be completed on time for the schedule of the corresponding frame-driven trigger pattern.

In other implementations, however, this scenario in which black frames or copies of previous frames would need to be transmitted due to timing anomalies may occur more often, and may be determined to be disruptive to processing at the next pipeline stage and/or disruptive to end users consuming the data generated based on the frames. Accordingly, in certain implementations, each system node may be configured, subsequent to performing its associated frame processing task and prior to transmitting its current frame to the next system node in the subsequent pipeline stage, to temporarily store the processed frame in a respective jitter buffer included within the system node. For example, the jitter buffer may be large enough to queue up one or more frames that are ready to be transmitted prior to the frames actually be transmitted at one of the frame transmit times defined by the frame-driven trigger pattern. In this way, the jitter buffer provides an allowance for occasional timing anomalies in processing performance time without black or repeated frames needing to be transmitted when such timing anomalies occur.

Figure 6:
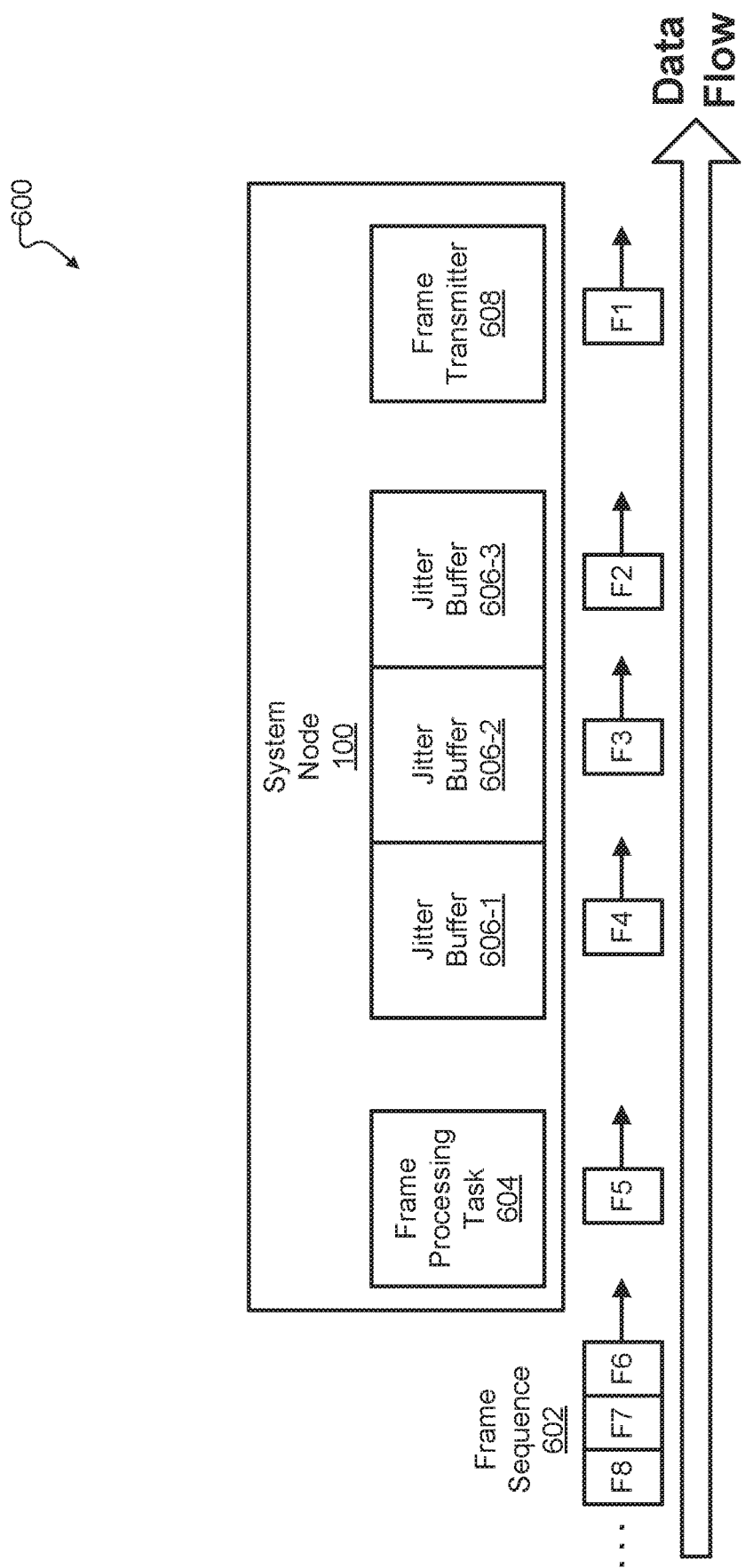
FIG. 6 illustrates an exemplary data flow of a frame sequence through an exemplary system node according to embodiments described herein.

To illustrate, FIG. 6 shows an exemplary data flow 600 of a frame sequence 602 through an exemplary system node 100. As shown, system 100 is configured to perform a frame processing task at a processing stage labeled frame processing task 604, to buffer frames for three synchronization cycles at a three-frame jitter buffer 606 (that includes three frame buffer components labeled jitter buffer 606-1, 606-2, and 606-3), and to then transmit completed frames at a frame transmitter 608. As shown by the block arrow below the system node 100, data will be understood to flow through the system node 100 from left to right with a first frame ("F1") of frame sequence 602 making its way through the system node first, followed by other frames of frame sequence 602 (e.g., "F2", "F3", "F4", etc.).

At each frame transmit time of a predefined frame-driven trigger pattern, each frame may advance through the system node 100 to the processing component vacated by the preceding frame. For example, after the synchronization cycle illustrated in FIG. 6 is complete (i.e., when the next frame transmit time occurs), frame "F1" may advance through the subsequent system node 100 (not explicitly shown in FIG. 6), frame "F2" may advance to frame transmitter 608 to be transmitted to the subsequent system node 100 for processing, frame "F3" may advance to be temporarily stored at jitter buffer component 606-3, frame "F4" may advance to be temporarily stored at jitter buffer component 606-2, frame "F5" may advance to be temporarily stored at jitter buffer component 606-1, frame "F6" (which will be understood to be undergoing processing or buffering at an unshown system node 100 at the moment depicted in FIG. 6) may advance to be transmitted by the unshown system node to be received and processed at frame processing task 604, and so forth.

It will be understood that the frame transmission by one system node 100 (e.g., performed by the frame transmitter 608 of the system node 100) and the frame processing task of a subsequent system node 100 (e.g., performed by the frame processing task 604 of the subsequent system node 100) may, in certain implementations, be performed during the same synchronization cycle. For example, when a frame transmit time occurs, a frame may advance to the frame transmitter 608 and be transmitted during the first part of the synchronization cycle, and may arrive at the subsequent system node 100 and be processed by its respective frame processing task 604 prior to the next frame transmit time. Thereafter, once frame processing task 604 has been performed (even if not quite complete by the frame transmit time, as described above), each frame may be stored in the successive jitter buffer components 606-1, 606-2, and 606-3 to thereby reduce or eliminate undesirable consequences of the jitter (i.e., the difference in processing times used to process each frame, including some processing times that may be slightly longer than a single synchronization cycle) such that, after three synchronizations cycles in jitter buffer 606, each frame is guaranteed or very likely to have been fully processed and ready for transmission to the subsequent pipeline stage.

The number of jitter buffer components included within a particular jitter buffer may depend on various factors including how much latency a particular implementation of the multi-stage modular architecture can afford, how much jitter a particular system node is measured or expected to have (i.e., how common it is for the system node to fail to complete the frame processing task in time due to scheduling delays in the kernel, network stack buffering, etc.), and/or various other factors as may be accounted for in a particular implementation. As shown in FIG. 6, jitter buffer 606 includes three jitter buffer components, thereby allowing the system node 100 up to three synchronization cycles to get caught up after a timing anomaly causes the system node 100 to experience significant jitter for (i.e., take extra time processing) one particular frame.

Figure 7:
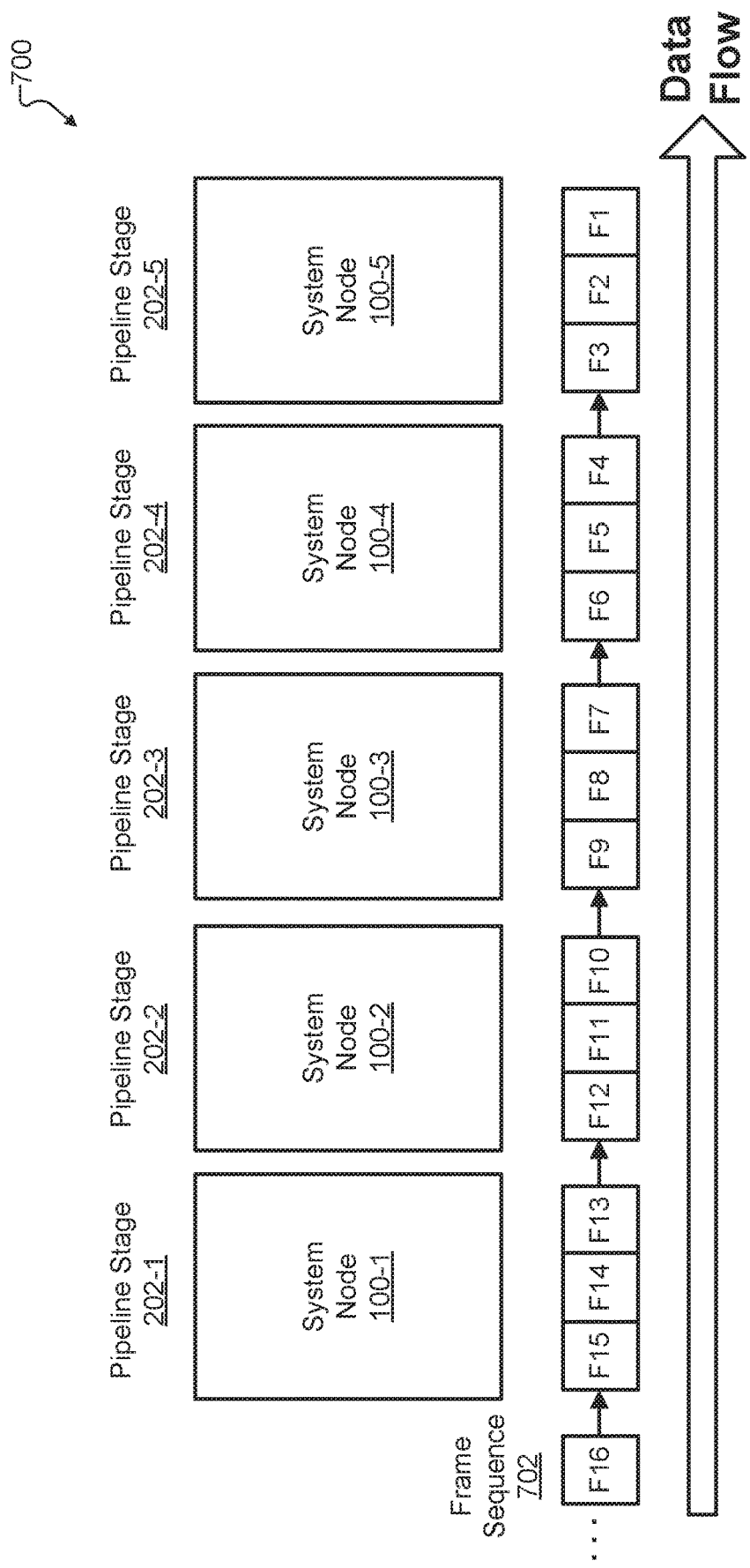
FIG. 7 illustrates an exemplary data flow of a frame sequence through various system nodes included in different pipeline stages of a multi-stage modular architecture according to embodiments described herein.

Zooming out to illustrate multiple system nodes 100, FIG. 7 shows an exemplary data flow 700 of a frame sequence 702 through several system nodes 100 included in different pipeline stages 202 of a multi-stage modular architecture. Specifically, frame sequence 702 is shown to flow through a system node 100-1 included within a pipeline stage 202-1, a system node 100-2 included within a pipeline stage 202-2, a system node 100-3 included within a pipeline stage 202-3, and so forth. As frame sequence 702 is processed in accordance with data flow 700, it will be understood that each system node 100 shown in FIG. 7 includes similar processing components as illustrated and described above for the system node 100 illustrated in FIG. 6. In this example, however, each system node 100 includes only two jitter buffer components per jitter buffer, such that each system node 100 works on three frames at a time (i.e., one new frame that is received and processed, and two previously-processed frames that are buffered in preparation for transmission).

If it is assumed that the five pipeline stages 202-1 through 202-5 are the only pipeline stages included in this particular multi-stage modular architecture, FIG. 7 shows an example in which the total latency of the multi-stage modular architecture is 15 frames (e.g., 0.5 seconds if the frame rate is 30 fps). This is because it takes 15 synchronization cycles for each frame to traverse all the pipeline stages 202 from when the frame enters the pipeline until the frame leaves the pipeline. If the implementation of multi-stage modular architecture is able to bear a longer latency than this and if jitter occasionally is still manifested in the output, designers may consider adding additional jitter buffer components to one or more of the systems nodes 100 to further mitigate jitter issues as a tradeoff for increasing the latency. Conversely, if jitter issues are less of a design concern and it is desirable to reduce the latency for a given application, designers may consider removing some or all of the jitter buffering to thereby reduce the latency to as low as 5 frames as a tradeoff for potentially exacerbating jitter issues.

As has been mentioned, a specific multi-stage modular architecture implementation referred to as a volumetric processing system and configured to perform extended reality content generation will now be described in relation to FIGS. 8 through 10. As will be illustrated below, the volumetric processing system may include a set of system nodes arranged in a multi-stage modular architecture, the set of system nodes including 1) a set of image capture system nodes included within an image capture pipeline stage of the multi-stage modular architecture and each configured to capture and provide surface data representative of color and depth characteristics of surface points of an object located within a capture scene; 2) a set of point cloud generation system nodes included within a point cloud generation pipeline stage of the multi-stage modular architecture and each configured to generate respective point clouds based on the captured surface data; 3) a point cloud organizer system node included within a point cloud organizer pipeline stage of the multi-stage modular architecture and configured to consolidate point cloud data, from one or more of the respective point clouds generated by the set of point cloud generation system nodes, that corresponds to a surface of the object; 4) a voxelizer system node included within a voxelizer pipeline stage of the multi-stage modular architecture and configured to generate, based on the consolidated point cloud data for the object, a voxel grid representative of the object; and 5) a set of rendering system nodes included within a rendering pipeline stage of the multi-stage modular architecture and configured to generate, based on the voxel grid, a set of rendered patches each depicting at least a portion of the object.

In this exemplary volumetric processing system, each system node of this set of system nodes may further be configured to transmit, subsequent to performing a respective processing task on a respective frame, the respective frame to a different system node of the set of system nodes, the different system node included within a different pipeline stage within the multi-stage modular architecture. Moreover, the transmitting of each respective frame by each system node of the set of system nodes may be performed synchronously so as to be performed within a predetermined threshold time of the transmitting of the other respective frames by each of the other system nodes of the set of system nodes. Additional details related to volumetric processing systems are described in U.S. patent application Ser. No. 16/587,285 ("the volumetric processing application"), which was filed Sep. 30, 2019, and is entitled SYSTEMS AND METHODS FOR PROCESSING VOLUMETRIC DATA USING A MODULAR NETWORK ARCHITECTURE. The content of this application is hereby incorporated by reference in its entirety.

Figure 8:
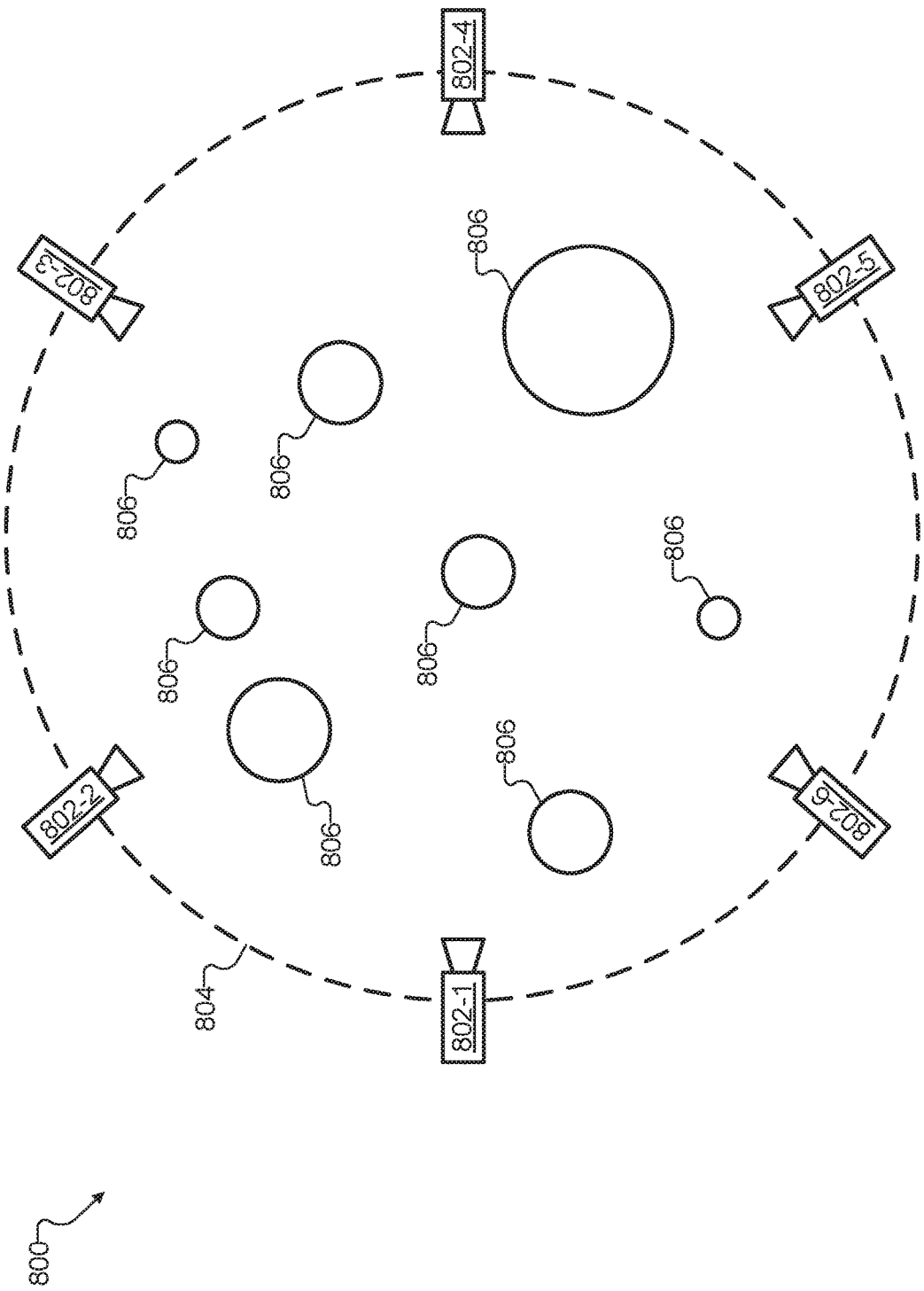
FIG. 8 illustrates an exemplary capture configuration in which an exemplary set of image capture systems are disposed at different vantage points with respect to a capture area according to embodiments described herein.
Figure 9:
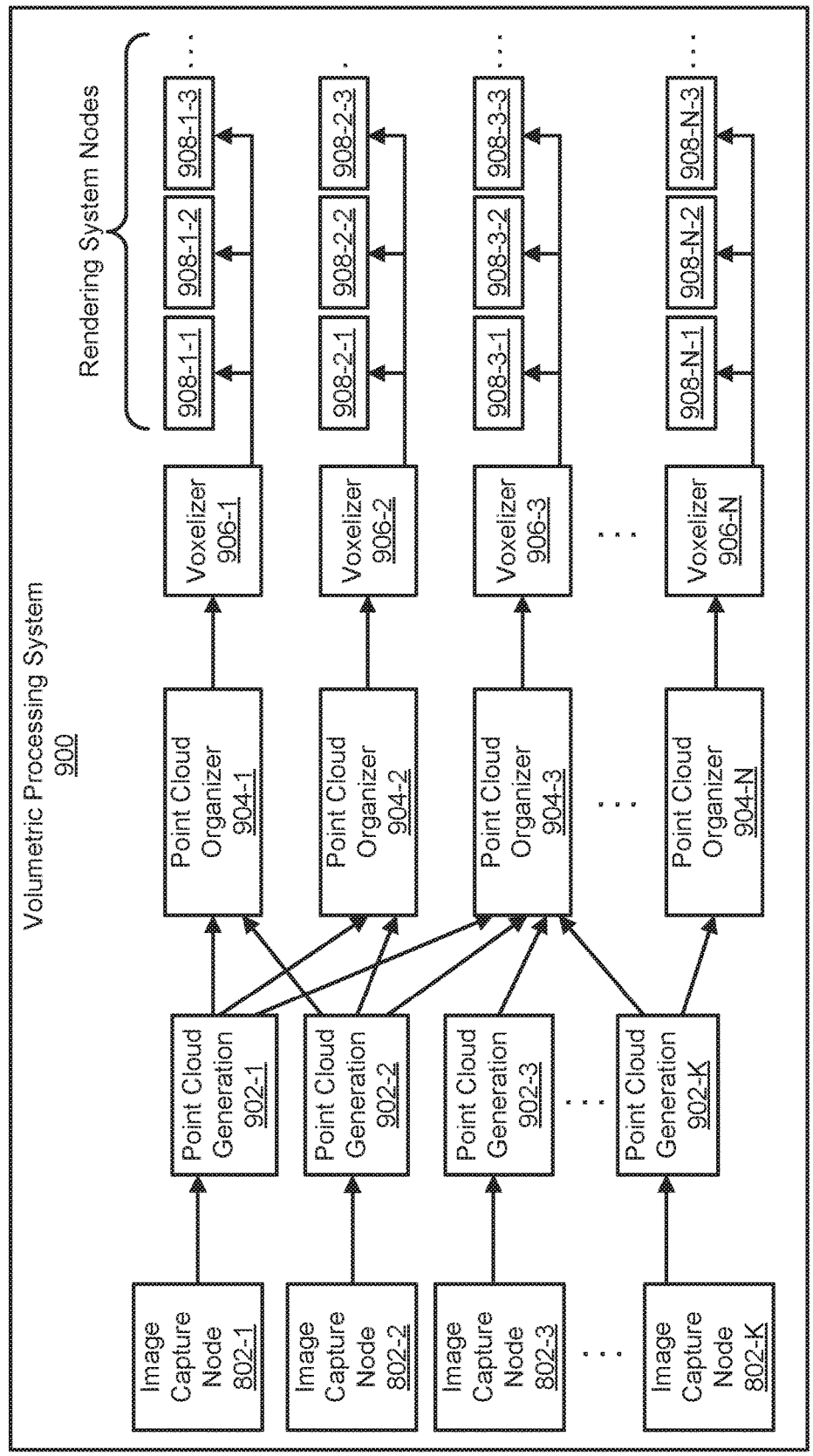
FIG. 9 illustrates an exemplary volumetric processing system according to embodiments described herein.

FIG. 8 illustrates an exemplary capture configuration 800 in which an exemplary set of image capture system nodes 802 (i.e., image capture system nodes 802-1 through 802-6) are disposed at different vantage points with respect to a capture area 804. Each image capture system node 802 may include any suitable type and/or number of physical capture devices. As used herein, a "physical capture device" may refer to a discrete or standalone physical device configured to capture image data representative of object surfaces (e.g., color data, depth data, etc.). For example, physical capture devices may include photo cameras, video cameras, light field cameras, and other types of image capture devices as may serve a particular implementation. Similarly, as used herein, an "image capture system node" may represent a discrete source of image data (i.e., by providing image data captured from a particular vantage point, etc.) and may, in certain examples, be implemented by a single physical capture device or combination of multiple coordinated physical capture devices (e.g., in a multi-element 360° image capture device or the like).

To illustrate the context in which image capture by image capture system nodes 802 may be performed, FIG. 8 shows capture configuration 800, in which various image capture system nodes 802 are disposed at the different vantage points with respect to capture area 804. Each image capture system node 802 may capture, from a respective vantage point with respect to capture area 804, surface data such as color data (i.e., how surface points appear in either color or grayscale) and/or depth data (i.e., where surface points are located with respect to a vantage-point-specific coordinate system or world coordinate system). Additionally, each image capture system node 802 may generate additional data (e.g., metadata indicative of the vantage point from which surface data is captured, etc.) to be provided to downstream data processing systems together with the surface data.

Capture area 804 may represent any real-world area or region that may be captured by a set of image capture system nodes such as image capture system nodes 802. For example, capture area 804 may be a relatively small area (e.g., a single room or smaller) or a relatively large area (e.g., a playing field of a professional sports stadium or larger). Capture area 804 may take any shape or form (e.g., the circular shape shown in FIG. 8, a square or rectangular shape, an irregular shape, etc.), including a single continuous area or a collection of unconnected areas. Additionally, capture area 804 may be associated with an event that is ongoing (e.g., a sporting event, a concert, a festival or party, etc.) in any indoor area, outdoor area, or combination area that includes indoor and outdoor regions.

As shown, various objects 806 are included within capture area 804. While, for sake of illustration, objects 806 are depicted as different sized circles, it will be understood that each object 806 may represent any type of animate or inanimate object of any shape or size as may serve a particular implementation. For instance, if capture area 804 includes a football stadium, objects 806 may represent the players on each team, the football, the goal posts, the referees, and so forth. As another example, if capture area 804 includes a stage where a concert is taking place, objects 806 may represent musicians, musical instruments, microphones, and the like. Accordingly, each object 806 will be understood to be any type of real-world object that is visible or detectable in capture area 804 and that is to be represented within extended reality media content that is to be generated as a result of the volumetric data processing.

Image capture system nodes 802 may provide data to other system nodes in a multi-stage modular architecture implementing a volumetric processing system. To illustrate, FIG. 9 shows an exemplary volumetric processing system 900 that includes image capture system nodes 802 together with various other types of system nodes that will now be described.

As described in more detail in the volumetric processing application, volumetric processing system 900 is configured to process volumetric data using a modular network architecture that is highly scalable so as to incorporate a plurality of each type of system node mentioned above (e.g., image capture system nodes, point cloud generation system nodes, point cloud organizer system nodes, voxelizer system nodes, rendering system nodes, etc.) so as to be capable of processing volumetric data for a capture area that includes a plurality of different objects (e.g., N different objects, where N is any integer representative of the number of objects included within the capture area). Specifically, as shown in FIG. 9, volumetric processing system 900 includes, together with image capture system nodes 802, a set of point cloud generation system nodes 902 each corresponding to respective image capture system nodes 802 as shown. The set of point cloud generation system nodes 902 may include K point cloud generation system nodes 902 (where K is the number of image capture system nodes 802 employed in a particular implementation) and may be configured to generate respective point clouds for each of the K different vantage points based on the surface data captured and provided by image capture system nodes 802.

Volumetric processing system 900 further includes a plurality of point cloud organizer system nodes 904 (e.g., N point cloud organizer system nodes 904-1 through 904-N) that are configured to consolidate respective point cloud data (e.g., first point cloud data, second point cloud data, etc., up to Nth point cloud data) that corresponds to respective surfaces of the N objects 806 included in capture area 804. For example, as will be described in more detail below, point cloud organizer system node 904-1 consolidates first point cloud data corresponding to a surface of a first object from a subset of point clouds (i.e., point clouds generated by point cloud generation system nodes 902-1 and 902-2), point cloud organizer system node 904-2 consolidates second point cloud data corresponding to a surface of a second object from the same subset of point clouds, point cloud organizer system node 904-3 consolidates third point cloud data corresponding to a surface of a third object from a different subset of point clouds (i.e., point clouds generated by point cloud generation system nodes 902-1, 902-2, 902-3, and 902-K), and so forth.

Volumetric processing system 900 further includes a plurality of voxelizer system nodes 906 (e.g., N voxelizer system nodes 906-1 through 906-N) that are configured to generate respective voxel grids representative of the respective objects with which the voxelizer system nodes are associated. More particularly, each voxelizer system node 906 corresponds with and receives consolidated point cloud data from a particular point cloud organizer system node 904, and the point cloud data is representative of all the relevant point cloud data that has been consolidated (e.g., from the relevant subset of point cloud generation system nodes 902) for the respective object. For example, voxelizer system node 906-1 generates a first voxel grid representative of the first object based on the consolidated first point cloud data, voxelizer system node 906-2 generates a second voxel grid representative of the second object based on the consolidated second point cloud data, voxelizer system node 906-3 generates a third voxel grid representative of the third object based on the consolidated third point cloud data, and so forth.

Associated with each point cloud organizer system node 904 and voxelizer system node 906 pair, volumetric processing system 900 further includes a respective set of rendering system nodes 908 (e.g., N sets of rendering system nodes 908 labeled rendering system nodes 908-1-X through 908-N-X, where X represents an index for differentiating the different rendering system nodes in each respective set of rendering system nodes). Each set of rendering system nodes 908 may be configured to generate, based on a respective voxel grid generated by the associated voxelizer system node 906, a respective set of rendered patches each depicting at least a part of the surface of the respective object. For example, the set of rendering system nodes 908-1 associated with voxelizer system node 906-1 may generate rendered patches each depicting at least a part of the surface of the first object based on the first voxel grid, the set of rendering system nodes 908-2 associated with voxelizer system node 906-2 may generate rendered patches each depicting at least a part of the surface of the second object based on the second voxel grid, the set of rendering system nodes 908-3 associated with voxelizer system nodes 906-3 may generate rendered patches each depicting at least a part of the surface of the third object based on the third voxel grid, and so forth.

Additional description and detail relating to how each of the system components of volumetric processing system 900 operates to process volumetric data using a multi-stage modular architecture (also referred to as a modular network architecture in the volumetric processing application) is provided in the volumetric processing application that is incorporated by reference in its entirety.

Figure 10:
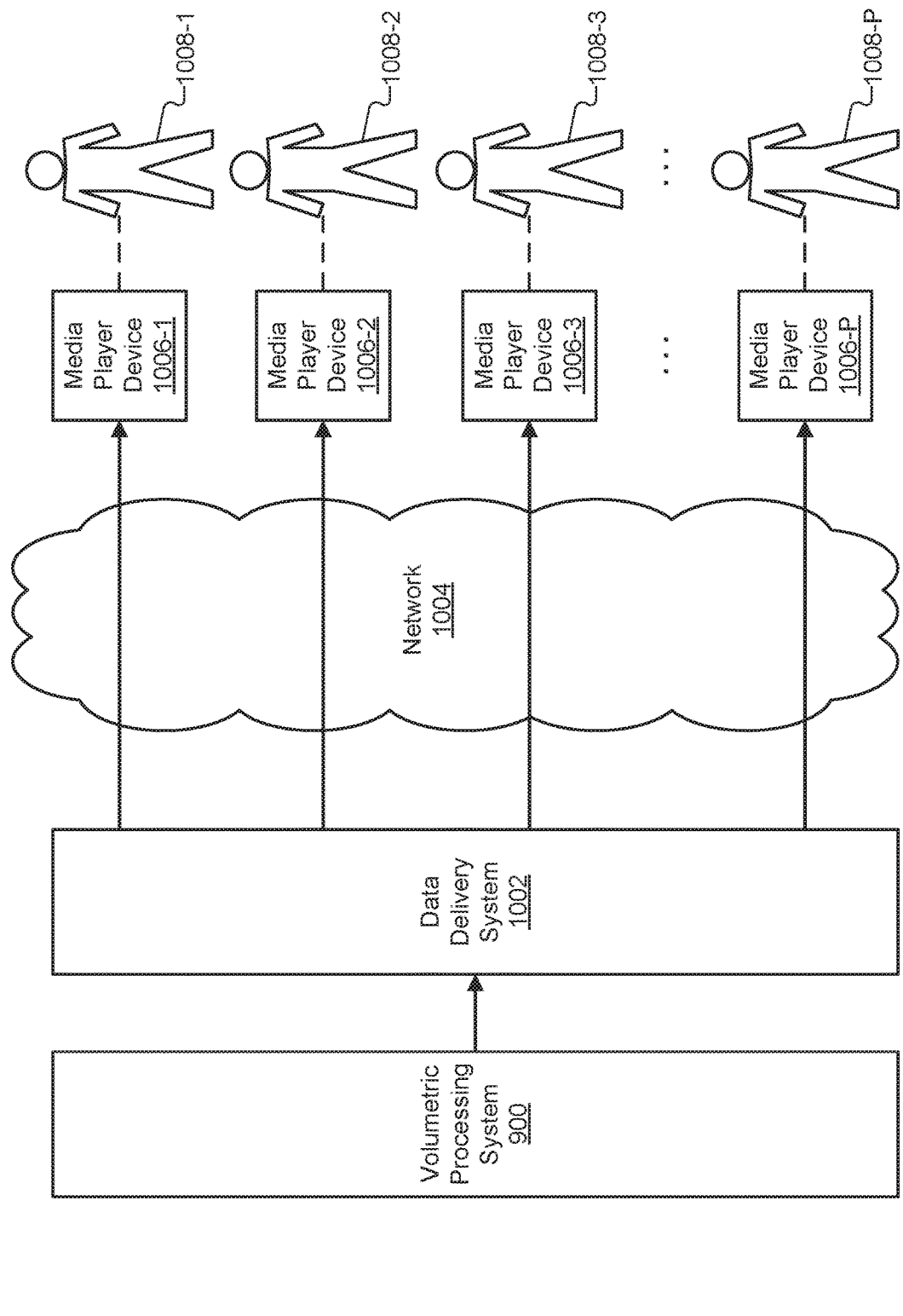
FIG. 10 illustrates an exemplary configuration in which the volumetric processing system of FIG. 9 operates to provide extended reality media content for users to experience according to embodiments described herein.

FIG. 10 illustrates an exemplary configuration 1000 in which volumetric processing system 900 operates to generate and provide extended reality content for users to experience using respective media player devices. As shown, volumetric processing system 900 provides data (e.g., rendered patches generated by the respective sets of rendering system nodes 908) to a data delivery system 1002 that will be understood to include any suitable computing resources configured to receive and process the rendered patches (e.g., arranged together in atlas images as described in the volumetric processing application) to prepare and provide the rendered patches over a network 1004 to various media player devices 1006 (e.g., media player devices 1006-1 through 1006-P) together with any other data (e.g., metadata, etc.) as may be useful to allow media player devices 1006 to render the extended reality world based on the rendered patches. To this end, data delivery system 1002 may include encoding resources configured to convert sequences of atlas images to video images in standard encoded formats that may be convenient for transferring (e.g., streaming) extended reality content to media player devices 1006, and for processing and/or rendering the content by media player devices 1006.

As shown, data delivery system 1002 may transmit data representative of extended reality content to media player devices 1006 (which are associated with respective users 1008-1 through 1008-P) by way of network 1004. In some examples, network 1004 may include or be implemented by a provider-specific wired or wireless communications network (e.g., a cellular network used for mobile phone and data communications, a 4G or 5G network or network of another suitable technology generation, a cable or satellite carrier network, a mobile telephone network, etc.) that is operated and/or managed by a provider entity such as a mobile network operator (e.g., a wireless service provider, a wireless carrier, a cellular company, etc.). For instance, the provider of such a provider network may own or control all of the elements necessary to sell and deliver communications services to users 1008, including radio spectrum allocation, wireless network infrastructure, back haul infrastructure, customer care, provisioning of devices, network repair for network 1004, and so forth.

Additionally or alternatively, network 1004 may include or be implemented by any interconnected network infrastructure that is external to a provider network and outside of the control of a specific network provider. For example, network 1004 may include the Internet, a wide area network, a content delivery network, and/or any other suitable network or networks. In any case, network 1004 may be configured to provide data delivery between server-side provider systems (e.g., volumetric processing system 900, data delivery system 1002, etc.) and client-side systems and devices (e.g., media player devices 1006). To this end, network 1004 may implement or employ any suitable communication technologies, devices, media, protocols, or the like as may serve a particular implementation.

Each media player device 1006 may be implemented as (or may be included within) any suitable computing system or device as may be employed for performing any of the use cases or applications described herein. Specifically, for example, a particular media player device 1006 may include one or more display screens (e.g., traditional display screens, partially transparent heads-up display ("HUD") screens, computer monitors, etc.) configured to display rendered graphics representative of an extended reality world presented by the media player device 1006. Each media player device 1006 may be implemented as a mobile device (e.g., a smartphone, a tablet computing device, etc.), a virtual or augmented reality device (e.g., a head-mounted device configured to display graphics directly in front of each eye of user 1008), a portable or stationary computing device (e.g., a personal desktop or laptop computer, etc.), a television device, or any other system or device as may serve a particular implementation.

Each user 1008 may represent any person viewing graphics presented by a respective media player device 1006 and will be understood to have some degree of control over what graphics the media player device 1006 presents. For example, a particular user 1008 may indicate a particular viewpoint, within an extended reality world corresponding to a capture area, captured by the image capture system nodes 802, from which the user 1008 wishes to view the world by moving an avatar around within the extended reality world, turning to look in different directions, and so forth. As the user 1008 navigates in this manner, his or her media player device 1006 may be configured to render the extended reality world from the desired viewpoint based on the extended reality media content (e.g., the rendered patches and so forth) provided by volumetric processing system 900 and data delivery system 1002.

Figure 11:
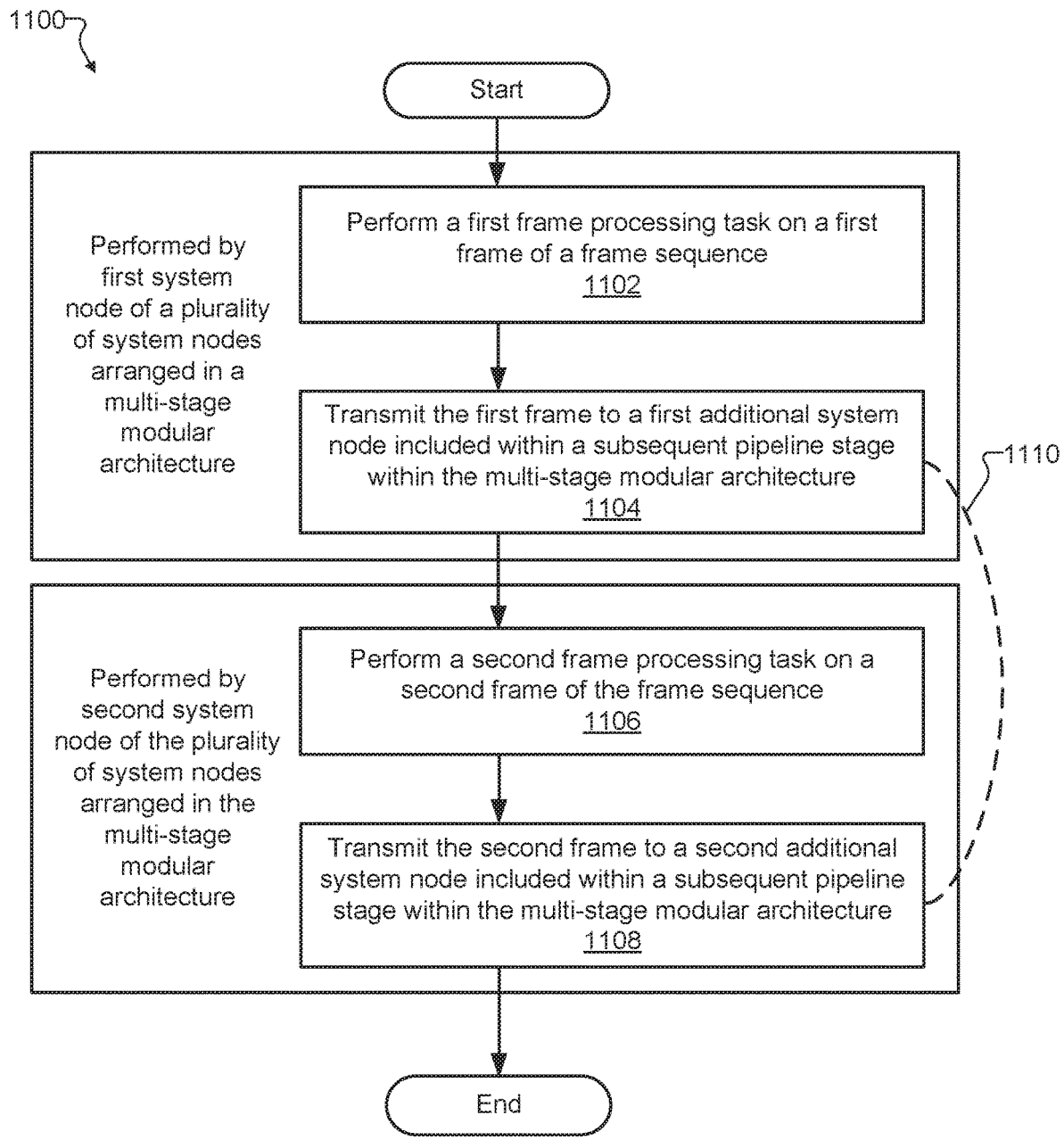
FIG. 11 illustrates an exemplary method for synchronizing frame processing within a multi-stage modular architecture according to embodiments described herein.

FIG. 11 illustrates an exemplary method 1100 for synchronizing frame processing within a multi-stage modular architecture. While FIG. 11 illustrates exemplary operations according to one embodiment, other embodiments may omit, add to, reorder, and/or modify any of the operations shown in FIG. 11. As shown and as will be described in more detail below, the operations of method 1100 may be performed by system nodes arranged in a multi-stage modular architecture, such as any of the system nodes described herein. For example, method 1100 may be performed by implementations of system node 100, any components included therein, and/or any implementation thereof.

In operation 1102, a first system node of a plurality of system nodes arranged in a multi-stage modular architecture may perform a first frame processing task on a first frame of a frame sequence. The first system node may be included within a first pipeline stage of the multi-stage modular architecture and, as such, the first frame processing task performed in operation 1102 may be associated with the first pipeline stage (e.g., such that other system nodes included within the first pipeline stage may also perform the first frame processing task on other respective frames as described herein). Operation 1102 may be performed in any of the ways described herein.

In operation 1104, the first system node may transmit the first frame to a first additional system node included within a pipeline stage subsequent to the first pipeline stage within the multi-stage modular architecture. For example, the first system node may transmit the first frame subsequent to performing the first frame processing task on the first frame in operation 1102. Operation 1104 may be performed in any of the ways described herein.

In operation 1106, a second system node of the plurality of system nodes arranged in the multi-stage modular architecture may perform a second frame processing task on a second frame of the frame sequence. The second system node may be included within a second pipeline stage of the multi-stage modular architecture, and, as such, the second frame processing task performed in operation 1106 may be associated with the second pipeline stage (e.g., such that other system nodes included within the second pipeline stage may also perform the second frame processing task on other respective frames as described herein). Operation 1106 may be performed in any of the ways described herein.

In operation 1108, the second system node may transmit the second frame to a second additional system node included within a pipeline stage subsequent to the second pipeline stage within the multi-stage modular architecture. For example, the second system node may transmit the second frame subsequent to performing the second frame processing task in operation 1106. Operation 1108 may be performed in any of the ways described herein. For example, as indicated by dashed line 1110, the transmitting of the second frame in operation 1108 may be synchronized with the transmitting of the first frame in operation 1104 so as to be performed within a predetermined threshold time of the transmitting of the first frame in operation 1104.

In certain embodiments, one or more of the systems, components, and/or processes described herein may be implemented and/or performed by one or more appropriately configured computing systems or devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing system or device or may be implemented on more than one physical computing system or device. Accordingly, system components may include any number of computing systems and devices, and may employ any of a number of computer operating systems.

In certain embodiments, one or more of the processes described herein may be implemented at least in part as instructions embodied in a non-transitory computer-readable medium and executable by one or more computing systems. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 12:
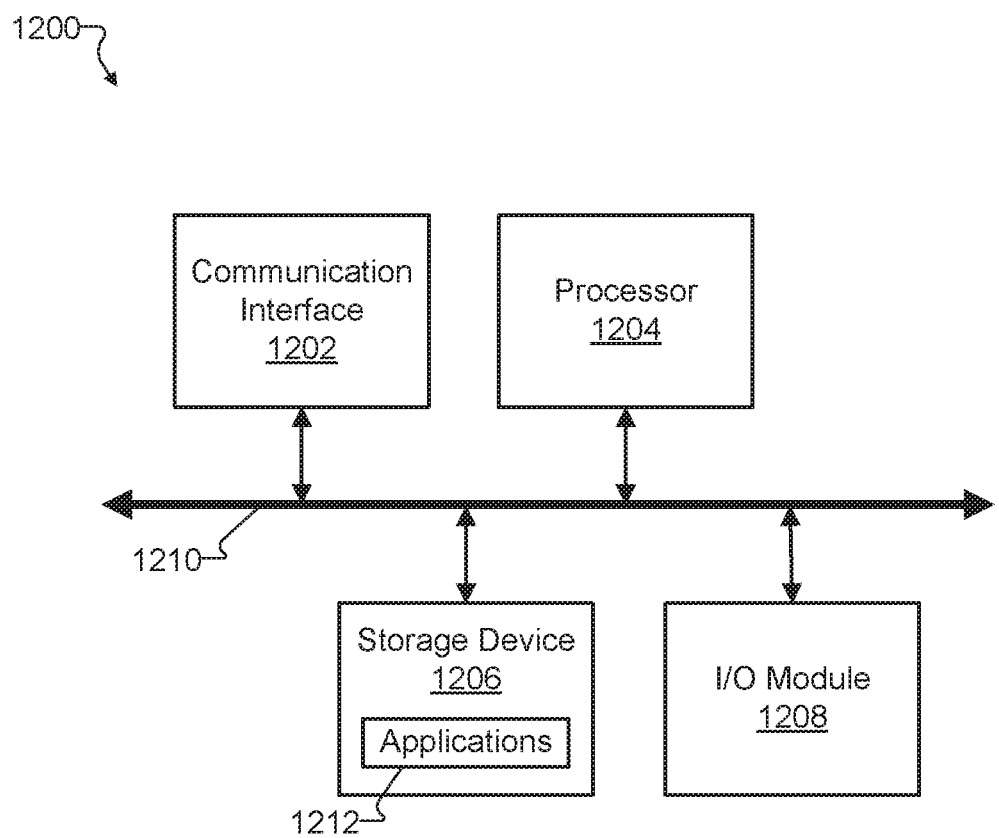
FIG. 12 illustrates an exemplary computing system according to embodiments described herein.

FIG. 12 illustrates an exemplary computing system 1200 that may be specifically configured to perform one or more of the processes described herein. For example, computing system 1200 may implement any of the system node 100 implementations described herein, including general system nodes 100 or more specific implementations such as image capture system nodes, point cloud generation system nodes, point cloud organizer system nodes, voxelizer system nodes, rendering system nodes, or any other computing systems or devices described herein.

As shown in FIG. 12, computing system 1200 may represent any computing system or device that includes components such as a communication interface 1202, a processor 1204, a storage device 1206, and an input/output ("I/O") module 1208 communicatively connected via a communication infrastructure 1210. While an exemplary computing system 1200 is shown in FIG. 12, the components illustrated in FIG. 12 are not intended to be limiting. Additional or alternative components may be used in other embodiments. Components of computing system 1200 shown in FIG. 12 will now be described in additional detail.

Communication interface 1202 may be configured to communicate with one or more computing systems and/or devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 1200. For example, one or more applications 1212 residing within storage device 1206 may be configured to direct processor 1204 to perform one or more processes or functions associated with one of the system node 100 implementations described herein.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
performing, by a first system node of a plurality of system nodes arranged in a multi-stage modular architecture, a first frame processing task on a first frame of a frame sequence, the first system node included within a first pipeline stage of the multi-stage modular architecture and the first frame processing task associated with the first pipeline stage;
performing, by a second system node of the plurality of system nodes, a second frame processing task on a second frame of the frame sequence, the second system node included within a second pipeline stage of the multi-stage modular architecture and the second frame processing task associated with the second pipeline stage; and
performing, by the first and second system nodes, periodic frame transmissions at frame transmit times defined by a frame-driven trigger pattern configured to trigger synchronous frame transmission for frames having arbitrary pixel resolution, the periodic frame transmissions including:
transmitting, by the first system node subsequent to performing the first frame processing task, the first frame to a first additional system node included within a pipeline stage subsequent to the first pipeline stage within the multi-stage modular architecture; and
transmitting, by the second system node subsequent to performing the second frame processing task, the second frame to a second additional system node included within a pipeline stage subsequent to the second pipeline stage within the multi-stage modular architecture, the transmitting of the second frame synchronized with the transmitting of the first frame so as to be performed within a predetermined threshold time of the transmitting of the first frame.

2. The method of claim 1, wherein:
the first pipeline stage further includes, along with the first system node, one or more additional system nodes configured to perform the first frame processing task on additional respective frames of one or more additional frame sequences;
the second pipeline stage further includes, along with the second system node, one or more additional system nodes configured to perform the second frame processing task on the additional respective frames of the one or more additional frame sequences; and
the additional system nodes included in the first and second pipeline stages are configured to transmit the additional respective frames in accordance with the frame-driven trigger pattern and in synchronization with the transmitting of the first and second frames by the first and second system nodes such that the transmitting of the additional respective frames occurs within the predetermined threshold time of the transmitting of the first and second frames.

3. The method of claim 1, further comprising:
synchronizing, by the first system node, a local clock of the first system node to a global clock for the multi-stage modular architecture; and
synchronizing, by the second system node, a local clock of the second system node to the global clock for the multi-stage modular architecture;
wherein the transmitting of the second frame is synchronized with the transmitting of the first frame based on the synchronizing of the local clocks of the first and second system nodes to the global clock for the multi-stage modular architecture.

4. The method of claim 3, wherein the synchronizing of the local clocks of the first and second system nodes to the global clock for the multi-stage modular architecture is performed by way of a message-based time synchronization scheme.

5. The method of claim 1, wherein the first and second system nodes each perform the periodic frame transmissions at the frame transmit times defined by the frame-driven trigger pattern by using a general-purpose operating system employing a thread with real-time priority rather than by using a real-time operating system.

6. The method of claim 1, further comprising:
temporarily storing, by the first system node subsequent to the performing of the first frame processing task and prior to the transmitting of the first frame to the first additional system node, the first frame in a first jitter buffer included within the first system node; and
temporarily storing, by the second system node subsequent to the performing of the second frame processing task and prior to the transmitting of the second frame to the second additional system node, the second frame in a second jitter buffer included within the second system node.

7. The method of claim 1, wherein the transmitting of the first and second frames are performed by way of a network interface that is configured to transmit, in a single transmission rather than incrementally over multiple transmissions, an entire frame that is at least as large as a larger of the first and second frames.

8. The method of claim 7, wherein the network interface is implemented by networking equipment that includes a router configured to implement a Precision Time Protocol boundary clock.

9. The method of claim 1, embodied as computer-executable instructions on at least one non-transitory computer-readable medium.

10. The method of claim 1, wherein each of the plurality of system nodes is implemented by a different modular computing device having its own network interface and local clock.

11. A system comprising:
a first system node of a plurality of system nodes arranged in a multi-stage modular architecture, the first system node included within a first pipeline stage of the multi-stage modular architecture and comprising a first processor configured to:
perform a first frame processing task on a first frame of a frame sequence, the first frame processing task associated with the first pipeline stage, and
perform periodic frame transmissions at frame transmit times defined by a frame-driven trigger pattern configured to trigger synchronous frame transmission for frames having arbitrary pixel resolution, the periodic frame transmissions including transmitting, subsequent to performing the first frame processing task, the first frame to a first additional system node included within a pipeline stage subsequent to the first pipeline stage within the multi-stage modular architecture; and a second system node of the plurality of system nodes, the second system node included within a second pipeline stage of the multi-stage modular architecture and comprising a second processor configured to:
  perform a second frame processing task on a second frame of the frame sequence, the second frame processing task associated with the second pipeline stage, and
  perform periodic frame transmissions at the frame transmit times defined by the frame-driven trigger pattern the periodic frame transmissions including transmitting, subsequent to performing the second frame processing task, the second frame to a second additional system node included within a pipeline stage subsequent to the second pipeline stage within the multi-stage modular architecture, the transmitting of the second frame synchronized with the transmitting of the first frame so as to be performed within a predetermined threshold time of the transmitting of the first frame.

12. The system of claim 11, further comprising:
one or more additional system nodes included in the first pipeline stage along with the first system node and configured to perform the first frame processing task on additional respective frames of one or more additional frame sequences; and
one or more additional system nodes included in the second pipeline stage along with the second system node and configured to perform the second frame processing task on the additional respective frames of the one or more additional frame sequences;
wherein the additional system nodes included in the first and second pipeline stages are configured to transmit the additional respective frames in accordance with the frame-driven trigger pattern and in synchronization with the transmitting of the first and second frames by the first and second system nodes such that the transmitting of the additional respective frames occurs within the predetermined threshold time of the transmitting of the first and second frames.

13. The system of claim 11, wherein:
the first processor of the first system node is further configured to synchronize a local clock of the first system node to a global clock for the multi-stage modular architecture;
the second processor of the second system node is further configured to synchronize a local clock of the second system node to the global clock for the multi-stage modular architecture; and
the transmitting of the second frame is synchronized with the transmitting of the first frame based on the synchronizing of the local clocks of the first and second system nodes to the global clock for the multi-stage modular architecture.

14. The system of claim 13, wherein:
the synchronizing of the local clocks of the first and second system nodes to the global clock for the multi-stage modular architecture is performed by way of a message-based time synchronization scheme.

15. The system of claim 11, wherein the first and second processors of the first and second system nodes are each configured to perform the periodic frame transmissions at the frame transmit times defined by the frame-driven trigger pattern by using a general-purpose operating system employing a thread with real-time priority rather than by using a real-time operating system.

16. The system of claim 11, wherein:
the first processor of the first system node is further configured to temporarily store, subsequent to the performing of the first frame processing task and prior to the transmitting of the first frame to the first additional system node, the first frame in a first jitter buffer included within the first system node; and
the second processor of the second system node is further configured to temporarily store, subsequent to the performing of the second frame processing task and prior to the transmitting of the second frame to the second additional system node, the second frame in a second jitter buffer included within the second system node.

17. The system of claim 11, wherein the transmitting of the first and second frames are performed by way of a network interface that is configured to transmit, in a single transmission rather than incrementally over multiple transmissions, an entire frame that is at least as large as a larger of the first and second frames.

18. The system of claim 11, wherein each of the plurality of system nodes is implemented by a different modular computing device having its own network interface and local clock.

19. A system comprising:
a set of system nodes arranged in a multi-stage modular architecture and each implemented by a different modular computing device having its own network interface and local clock, the set of system nodes including:
  a set of image capture system nodes included within an image capture pipeline stage of the multi-stage modular architecture and each configured to capture and provide surface data representative of color and depth characteristics of surface points of an object located within a capture scene;
  a set of point cloud generation system nodes included within a point cloud generation pipeline stage of the multi-stage modular architecture and each configured to generate respective point clouds based on the captured surface data;
  a point cloud organizer system node included within a point cloud organizer pipeline stage of the multi-stage modular architecture and configured to consolidate point cloud data, from one or more of the respective point clouds generated by the set of point cloud generation system nodes, that corresponds to a surface of the object;
  a voxelizer system node included within a voxelizer pipeline stage of the multi-stage modular architecture and configured to generate, based on the consolidated point cloud data for the object, a voxel grid representative of the object; and
  a set of rendering system nodes included within a rendering pipeline stage of the multi-stage modular architecture and configured to generate, based on the voxel grid, a set of rendered patches each depicting at least a portion of the object;
wherein:
  each system node of the set of system nodes is further configured to transmit, subsequent to performing a respective processing task on a respective frame, the respective frame to a different system node of the set of system nodes, the different system node included within a different pipeline stage within the multi-stage modular architecture; and
  the transmitting of each respective frame by each system node of the set of system nodes is performed synchronously so as to be performed within a predetermined threshold time of the transmitting of the other respective frames by each of the other system nodes of the set of system nodes.

20. The system of claim 17, wherein the network interface is implemented by networking equipment that includes a router configured to implement a Precision Time Protocol boundary clock.

* * * * *